US007027046B2

(12) United States Patent
Zhang

(10) Patent No.: US 7,027,046 B2
(45) Date of Patent: Apr. 11, 2006

(54) METHOD, SYSTEM, AND COMPUTER PROGRAM PRODUCT FOR VISIBILITY CULLING OF TERRAIN

(75) Inventor: Hansong Zhang, Mountain View, CA (US)

(73) Assignee: Vicarious Visions, Inc., Troy, NY (US)

(*) Notice: Subject to any disclaimer, the term of this patent is extended or adjusted under 35 U.S.C. 154(b) by 899 days.

(21) Appl. No.: 09/923,398

(22) Filed: Aug. 8, 2001

(65) Prior Publication Data

US 2002/0135591 A1 Sep. 26, 2002

Related U.S. Application Data

(60) Provisional application No. 60/267,424, filed on Feb. 9, 2001.

(51) Int. Cl.
*G06T 15/00* (2006.01)

(52) U.S. Cl. ........................................ 345/419; 345/581

(58) Field of Classification Search ................. 345/419, 345/581, 582, 583, 584, 585
See application file for complete search history.

(56) References Cited

U.S. PATENT DOCUMENTS 6,219,071 B1 4/2001 Krech, Jr. et al. .......... 345/503
6,424,351 B1 * 7/2002 Bishop et al. .............. 345/582

OTHER PUBLICATIONS

Weinhaus et al., Texture Mapping 3D Model of Real World Scenes, ACM Computing Surveys (CSUR) Dec. 1997, vol. 29 Issue 4.*

Cabral, B., et al., "Bidirectional Reflection Function from Surface Bump Maps," *Computer Graphics Proceedings, Annual Conference Series—SIGGRAPH '87* 21(4):273–281, Association for Computing Machinery, New York (Jul. 1987).

Cohen–Or, D. and Shaked, A., "Visibility and Dead–Zones in Digital Terrain Maps," *Eurographics 95*, 14(3):171–180, Blackwell Publishers (1995).

Crocetta, L., et al., "Visibility in Digital Terrain Maps: A Fuzzy Approach," 14$^{th}$ *Spring Conference on Computer Graphics*, pp. 257–266, Comenius University, Bratislave, Slovakia (Apr. 1998).

De Floriani, L. and Magillo, P.,"Algorithms for Visibility Computation on Digital Terrain Models," *Proceedings ACM Symposium on Applied Computing '93*, pp. 380–387, Association for Computing Machinery, New York (Feb. 1993).

De Floriani, L. and Magillo, P., "Computing Visibility Maps on a Digital Terrain Model," *Spatial Information Theory—A Theoretical Basis for GIS*, pp. 248–269, Springer–Verlag, Berlin, Germany (1993).

(Continued)

*Primary Examiner*—Phu K. Nguyen
(74) *Attorney, Agent, or Firm*—Sterne, Kessler, Goldstein & Fox PLLC

(57) ABSTRACT

A method, system, and computer program product are provided for visibility culling of terrain. A height field is perspective modulated. An occlusion height field is generated based on an orthographic height propagation of the perspective modulated height field. Graphics data is culled based on the generated occlusion height field. Texturing and blending operations can be used to accelerate the perspective modulation. A perspective modulation disk is used to modulate the first height field along radial slices from a viewpoint. Texture from a one-dimensional texture with distance values is mapped to the radial slices to obtain the perspective modulated height field. Generating an occlusion height field can also be carried out using texturing and blending and can be hardware-accelerated. According to a further feature, a shift disk or shift texture is used.

27 Claims, 17 Drawing Sheets

OTHER PUBLICATIONS

De Floriani, L. and Magillo, P., “Visibility Algorithms on Triangulated Digital Terrain Models,” *International Journal of Geographic Information Systems* 8(1):13–41, Taylor & Francis Ltd., London, England (Jan.–Feb. 1994).
De Floriani, L. and Magillo, P., “Horizon Computation on a Hierarchical Triangulated Terrain Model,” *The Visual Computer* 11(3):134–139, Springer–Verlag (1995).
Greene, N., et al., “Hierarchical Z–Buffer Visibility,” *Computer Graphics Proceedings, Annual Conference Series—SIGGRAPH 93*, pp. 231–238, Assocation for Computing Machinery, New York (Aug. 1993).
Lee, C.–H. and Shin, Y.G., “An Efficient Ray Tracing Method for Terrain Rendering,” *Pacific Graphics '95*, pp. 180–193 (Aug. 1995).
Max, Nelson L., “Shadows for Bump–Mapped Surfaces,” *Advanced Computer Graphics—Proceedings of Computer Graphics Tokyo '86*, pp. 144–156, Springer–Verlag, (1986).
Max, Nelson L., “Horizon Mapping: Shadows for Bump–Mapped Surfaces,” *The Visual Computer* 4(2):109–117, Springer–Verlag, Berlin, Germany (Jul. 1988).
Stewart, A. James, “Hierarchical Visibility in Terrains,” *Eurographics Rendering Workshop 1997*, pp. 217–228, Springer, Vienna, Austria (1997).
Stewart, James A., “Fast Horizon Computation at All Points of a Terrain With Visibility and Shading Applications,” *IEEE Transactions on Visualization and Computer Graphics 4*(1):82–93, IEEE (Jan.–Mar. 1998).
Teller, S.J. and Sequin, C.H., “Visibility Preprocessing For Interactive Walkthroughs,” *Computer Graphics Proceedings, Annual Conference Series—SIGGRAPH '91 25*(4):61–69, Association for Computing Machinery SIGGRAPH (Jul. 1991).
Trobec, T. et al., “Calculation of Visibility from Rastar Relief Models,” 14 *th Spring Conference on Computer Graphics*, pp. 257–266, Comenius University, Bratislava, Slovakia (Apr. 1998).
Zhang, H. et al., “Visibility Culling Using Hierarchical Occlusion Maps,” *Computer Graphics Proceedings, Annual Conference Series—SIGGRAPH '97*, pp. 77–88 (Aug. 1997).

* cited by examiner

EXAMPLE OF A TERRAIN DEFINED BY A HEIGHT FIELD

ARCHITECTURE 500

SHIFT DISK-HEIGHT PROPAGATION FIXED AT EACH ITERATION

SHIFT DISK-HEIGHT PROPAGATION VARIED AT EACH ITERATION

SHIFT TEXTURE-HEIGHT PROPAGATION FIXED AT EACH ITERATION

FIG. 9B

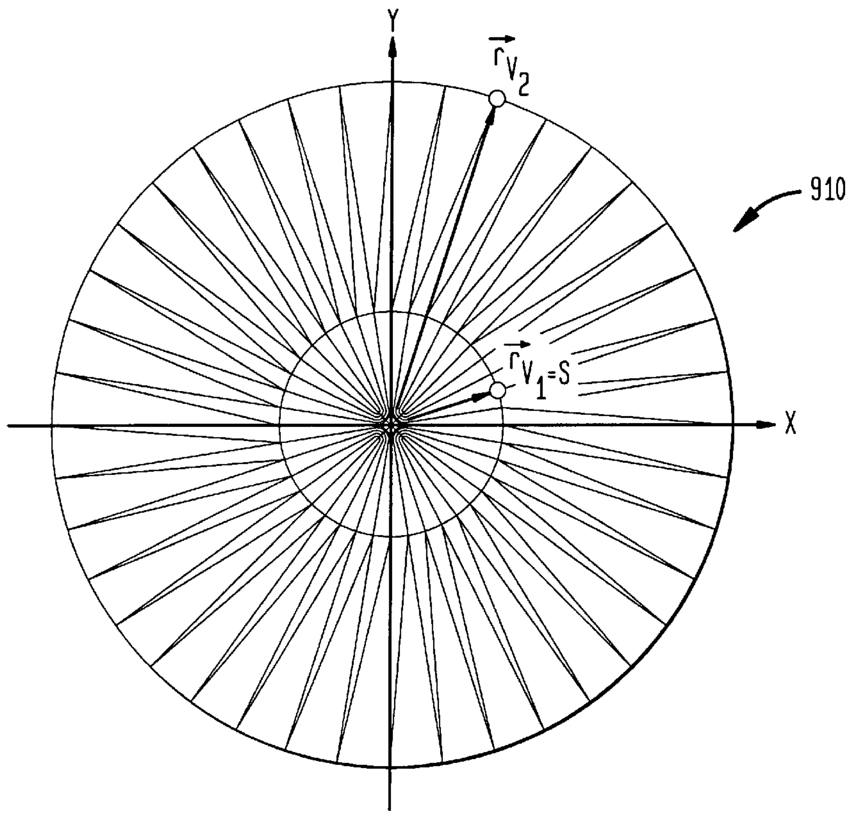

$V_1$'s POSITION $(|\vec{r}_{V_1}|\cos\theta_{V_1}/2+0.5,\ |\vec{r}_{V_1}|\sin\theta_{V_1}/2+0.5)$ $V_1$'s TEXTURE COORDINATES: (0.5, 0.5) (SAME AS THE DISK CENTER)

$V_2$'s POSITION $(|\vec{r}_{V_2}|\cos\theta_{V_2}/2+0.5,\ |\vec{r}_{V_2}|\sin\theta_{V_2}/2+0.5)$ $V_2$'s TEXTURE COORDINATES: $(|\vec{r}_{V_2}|\cos\theta_{V_2}/2+0.5,\ |\vec{r}_{V_2}|\sin\theta_{V_2}/2+0.5)$ THE SHIFT DISK. $V_1$ REPRESENTS ANY VERTEX ON THE INNER RING, AND $V_2$ THAT OF THE OUTER. s IS THE AMOUNT OF SHIFT. RADIUS OF THE INNER RING IS s. θ IS THE ANGLE WITH THE X AXIS. A TRANSLATION TO THE EYE POSITION IS ADDED TO BOTH POSITIONS AND TEXTURE COORDINATES USING THE MODEL-VIEW AND THE TEXTURE MATRIX, RESPECTIVELY, WHEN THE DISK IS DRAWN.

FIG. 12

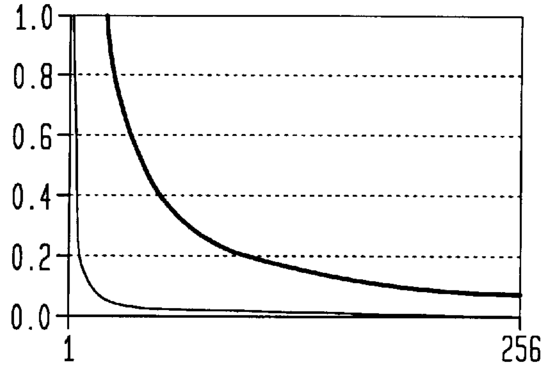

THE 1/d FUNCTION (THE THINNER LINE) AND THE SAME FUNCTION MULTIPLED BY A FACTOR OF 20 (i.e., $f_{\bar{H}}$ 20). USING THE LATTER FOR PERSPECTIVE MODULATION RESULTS IN MORE USEABLE RANGE IN THE MODULATED HEIGHT FIELD AND THUS THE OCCLUSION HEIGHT FIELD DERIVED FROM IT.

FIG. 13

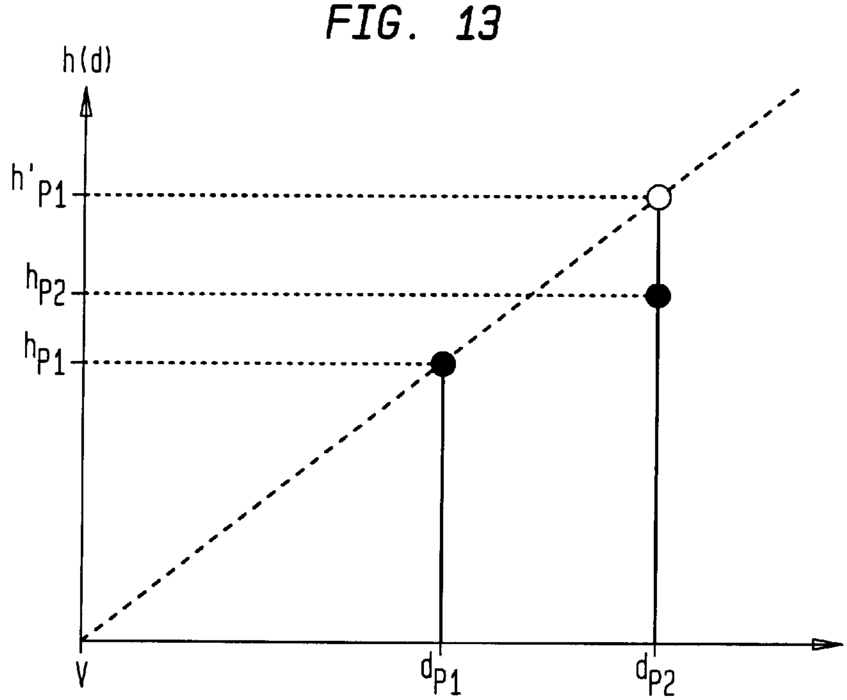

ORTHOGRAPHIC HEIGHT PROPOGATION ON A HEIGHT FIELD, AFTER PERSPECTIVE MODULATION, IS EQUIVALENT TO PERSPECTIVE HEIGHT PROPAGATION ON THE ORIGINAL HEIGHT FIELD

METHOD, SYSTEM, AND COMPUTER PROGRAM PRODUCT FOR VISIBILITY CULLING OF TERRAIN

CROSS-REFERENCE TO RELATED APPLICATIONS

This applications claims the benefit of priority to U.S. Provisional Application No. 60/267,424 filed Feb. 9, 2001 (incorporated in its entirety herein by reference).

BACKGROUND OF THE INVENTION

1. Field of the Invention

The present invention relates generally to computer graphics.

2. Background Art

Computer graphics systems render all kinds of objects for display and animation. An object is modeled in object space by a set of primitives (also called graphics primitives). Examples of primitives include, but are not limited to, triangles, polygons, lines, tetrahedra, curved surface, and bit-map images. Each primitive includes one or more vertices that define the primitive (or a fragment) in terms of position, color, depth, texture, and/or other information helpful for rendering.

Rendering terrain data has become especially important in many applications, such as, flight simulation and gaming. Terrain elevation is often defined by height data. Any type of height data can be used. For example, a height field can be defined by a function, h(x, y), where (x, y) forms a 2-D domain and the height function h represent elevation. In one example, the height function is often modeled or sampled on a uniform grid in the domain. The samples are then stored as a digital elevation map (DEM) that is essentially a gray-scale image representative of height.

Visibility culling on a height field involves the detection of height field portions (e.g., tiles) and features (e.g., buildings) that cannot be seen from a particular viewpoint. There have been many visibility algorithms proposed for general scenes and models. See, e.g., Seth J. Teller and Carlo H. Séquin, "Visibility Preprocessing for Interactive Walkthroughs," *Computer Graphics* (*Proceedings of SIGGRAPH* 91), 25 (4), pp. 61–69, July 1991; Ned Greene and M. Kass, "Hierarchical Z-Buffer Visibility," *Proceedings of SIGGRAPH*93, *Computer Graphics Proceedings*, Annual Conference Series, pp. 231–240 (1993, Anaheim, Calif.); and Hansong Zhang, D. Manocha, T. Hudson and K. Hoff, "Visibility Culling Using Hierarchical Occlusion Maps," Proceedings of SIGGRAPH97, *Computer Graphics Proceedings*, Annual Conference Series, pp. 77–88, August 1997. These alogrithms can be applied to terrain data, but do not take advantage of the characteristics of terrain data. Other algorithms have been proposed that directly involve terrain data. One approach by Max computes horizons at points on a bump map (one application of a height field). The result is used to compute shadows on bump mapped surfaces. The horizon is detected in eight directions around each sample point. Points that do not fall directly in these directions are not considered. See, Nelson L. Max, "Shadows for Bump-Mapped Surfaces," *Advanced Computer Graphics* (Proceedings of Computer Graphics Tokyo '86), Tsiyasu L. Kunii, Ed. 1986, pp. 145–156, Springer-Verlag; and Nelson L. Max, "Horizon Mapping: Shadows for Bump-Mapped Surfaces", *The Visual Computer*, vol. 4, no. 2, pp. 109–117, July 1988. A similar algorithm is applied to triangulated terrain and processes 24 directions around each point; the result is used to compute bi-directional reflection functions. See, B. Cabral, N. L. Max, and R. Springmeyer, "Bidirectional Reflection Function from Surface Bump Maps", in *Computer Graphics* (SIGGRAPH '87 Proceedings), July 1987, vol. 21, pp. 273–281. These algorithm can be adapted to visibility applications but are limited. To avoid visual artifacts, the number of directions they consider has to be increased greatly.

For more accurate horizons, an approach by Stewart considers all points of the terrain rather than only those that lie in particular directions. See, A. James Stewart, "Fast Horizon Computation at All Points of a Terrain With Visibility and Shading Applications," *IEEE Transactions on Visualization and Computer Graphics,* 4(1), pp. 82–93. Another approach shows that, when the terrain is stored as a dense grid of n rectilinear prisms, one needs to consider O(square root(n)) directions to avoid under-sampling. See, Daniel Cohen-Or and Amit Shaked, "Visibility and Dead-Zones in Digital Terrain Maps," *Computer Graphics Forum,* 14(3), Blackwell Publishers: Edited by Frits Post and Martin Göbel, pp. 171–180. See, also, a similar algorithm using ray tracing. C-H. Lee and Y. G. Shin, "An Efficient Ray Tracing Method for Terrain Rendering," *Pacific Graphics* '95, August 1995.

Trobec et. al. discuss improvements in precision through bi-linear reconstruction along the directions, or in speed by using a Bresenham algorithm. See, TomášTrobec, Borut Žalik, and Nikola Guid, "Calculation of Visibility from Raster Relief Models," 14th *Spring Conference on Computer Graphics*, Comenius University, Bratislava, Slovakia, Edited by LászlóSzirmay Kalos, pp. 257–266(April 1998), and earlier algorithms described by L. De Floriani, P. Magillo, "Algorithms for Visibility Computation on Digital Terrain Models," *Proceedings ACM Symposium on Applied Computing*'93, Indianapolis, February 1993, and L. De Floriani, P. Magillo, "Computing Visibility Maps on a Digital Terrain Model, Spatial Information Theory—A Theoretical Basis for GIS," A. U. Frank, I. Campari (Editors), *Lecture Notes in Computer Science*, N.7 16, Springer-Verlag, 1993, pp. 248–269. In general, many of the above algorithms are characterized as line-sweeping algorithms, because lines are explicitly and individually traced from the eye outward along selected directions.

Terrain visibility algorithms have been proposed. Visibility culling on a hierarchially represented terrain is described by Stewart. See, A. James Stewart, "Fast Horizon Computation at All Points of a Terrain With Visibility and Shading Applications," *IEEE Transactions on Visualization and Computer Graphics,* 4(1), 1998, pp. 82–93, and A. James Stewart, "Hierarchical Visibility in Terrains," *Eurographics Rendering Workshop* 1997, Springer Wien, Edited by Julie Dorsey and Philipp Slusallek, pp. 217–228. Characterization of several other terrain visibility algorithms can be found in L. De Floriani, P. Magillo, "Visibility Algorithms on Triangulated Digital Terrain Models," *International Journal of Geographic Information Systems*, London, 8, 1, 1994, and Leila De Floriani and Paola Magillo, "Horizon computation on a hierarchical triangulated terrain model.," *The Visual Computer,* 11(3), Springer-Verlag 1995, pp. 134–149. One approach determines a fuzzy visibility on terrain where a height value is represented as intervals instead of a single number. See, Livio Crocetta, Giovanni Gallo and Salvatore Spinello, "Visibility in Digital Terrain Maps: a Fuzzy Approach," 14th *Spring Conference on Computer Graphics*, Comenius University, Bratislava, Slovakia, Edited by Lászl óSzirmay Kalos, April 1998, pp. 257–266. Note that these algorithms compute a horizon map (in image or geometric form) to support the binary decision whether each point on the terrain is visible from the eye point. This is adequate only for determining whether a portion of the height field is occluded by other parts of the height field itself. The visibility and culling of other objects on the terrain (buildings, vehicles, trees, helicopters, etc.) is not accounted for in such a binary decision based on height field values. An actual minimum visible height at each height field point is not determined as in the present invention.

What is needed is an improved visibility algorithm for culling terrain data.

BRIEF SUMMARY OF THE INVENTION

The present invention provides an improved visibility algorithm for culling terrain data. A method, system and computer program product for visibility culling of terrain is provided. A height field is perspective modulated. An occlusion height field is generated based on an orthographic height propagation of the perspective modulated height field. Graphics data is then culled based on the generated occlusion height field.

In one embodiment, a method for visibility culling includes modulating a first height field as a function of distance to obtain a perspective modulated height field. In one example, the first height field is modulated as an inverse function of distance to obtain the perspective modulated height field. In another example, the modulating step modulates the first height field as an inverse function of distance scaled by a scaling factor to obtain the perspective modulated height field. In one example implementation, a perspective modulation disk is used to modulate the first height field along radial slices from a viewpoint.

In one embodiment, texturing (and blending) operation can be used to accelerate the perspective modulation. This has an advantage processing operations can be hardware accelerated on commercial off the shelf graphics hardware. In one example, the modulating step is carried out by drawing a perspective modulation disk of radial slices on top of a first height field centered at a viewpoint V. Texture from a one-dimensional texture is mapped to the radial slices to obtain the perspective modulated height field.

With respect to the orthographic height propagation, in one embodiment, a method further includes generating an occlusion height field based on an orthographic height propagation of the perspective modulated height field. In one example, the generating step includes comparing height values of the perspective-modulated height field at first and second sample locations separated by a propagation distance d, the first location being closer to the viewpoint than the second location. The height value of the second location is then updated with the greater height value determined in the comparison.

In one embodiment, a series of iterations are performed to generate an occlusion height field according to the invention. For example, each iteration can be a rendering or drawing pass through a graphics pipeline. Each iteration involves comparing and updating height values at multiple sampling locations along the lengths of radial slices. Height propagation is incremented by an incremental distance which can be fixed or varied for each iteration.

Like perspective modulation, generating an occlusion height field according to the present invention can also be carried out using texturing and blending and can be hardware-accelerated. According to a further feature, a shift disk or shift texture is used. The first height field is stored as a first height field texture. The perspective modulated height field is stored in a color channel of a frame buffer. A method then draws a first shift disk including texture mapping texels from the first height field texture, blends the texture mapped texels and the color values of the perspective modulated height field stored in the color channel of the frame buffer to obtain an updated shift disk. The updated shift disk has updated color values representing the updated height values based on a maximum comparison and texture coordinates shifted by an incremental distance.

In one embodiment, a system for visibility culling is provided. The system includes modulating means and generating means. The modulating means modulates a first height field as a function of distance to obtain a perspective modulated height field. The generating means for generates an occlusion height field based on an orthographic height propagation of the perspective modulated height field.

In one embodiment, a system includes host computer, and a graphics subsystem coupled to the host computer. The host computer includes a visibility culling controller. The visibility controller controls the graphics subsystem to modulate a first height field as a function of distance to obtain a perspective modulated height field and to generate an occlusion height field based on an orthographic height propagation of the perspective modulated height field.

In one example, the graphics subsystem includes a texture mapping unit and a blending unit. The visibility culling controller controls the texture mapping unit to modulate a first height field as a function of distance to obtain a perspective modulated height field and controls the texture mapping unit and the blending unit to generate the occlusion height field based on an orthographic height propagation of the perspective modulated height field. The texture mapping unit and the blending unit carry out processing operations in hardware.

The texture mapping unit modulates a first height field as a function of distance to obtain a perspective modulated height field in a processing operation implemented at least in part in hardware. The texture mapping unit and the blending unit generate the occlusion height field based on an orthographic height propagation of the perspective modulated height field in another processing operation implemented at least in part in hardware.

Another embodiment is a system having a visibility culling controller that controls a graphics subsystem.

Another embodiment is a visibility culling controller having first and second control logic. The first control logic enables a graphics subsystem to modulate a first height field as a function of distance to obtain a perspective modulated height field. The second control logic that enables a graphics subsystem to generate an occlusion height field based on an orthographic height propagation of the perspective modulated height field.

Another embodiment is a computer program product having a computer useable medium with computer program logic recorded thereon for enabling a processor to render a computer scene. The computer program logic includes first computer readable code that enables a processor to modulate a first height field as a function of distance to obtain a perspective modulated height field, and second control logic that enables a processor to generate an occlusion height field based on an orthographic height propagation of the perspective modulated height field.

Another embodiment is a visibility culling controller having first control logic that modulates a first height field as a function of distance to obtain a perspective modulated height field, and second control logic that generates an occlusion height field based on an orthographic height propagation of the perspective modulated height field.

Another embodiment is a system including a visibility culling controller, a first height field, and a graphics pipeline, such as, an OPENGL pipeline.

The present invention then provides a visibility culling algorithm for height fields that takes full advantage of the properties of terrain data. The algorithm is based, in essence, entirely on image processing of height field data, achieved in real-time through rendering and in one example per-pixel operations.

Unlike line-sweeping algorithms, an embodiment of the present invention does not have to trace individual lines, but instead can use texture mapping to achieve parallel processing of all height field points. Also, in one example, bilinear texture mapping automatically interpolates height values to achieve better reconstruction from height field data.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIG. 9B shows an example texture coordinate shift disk in a hardware-accelerated embodiment of the present invention.

FIG. 12 is a graph that plots examples of an inverse function and scaled inverse function used in perspective modulation according to the present invention.

FIG. 13 is a diagram that illustrates the equivalence of a perspective-modulated occlusion height field generated according to the present invention and an occlusion height field generated by perspective height propagation.

DETAILED DESCRIPTION OF THE INVENTION

Table of Contents

Figure 1:
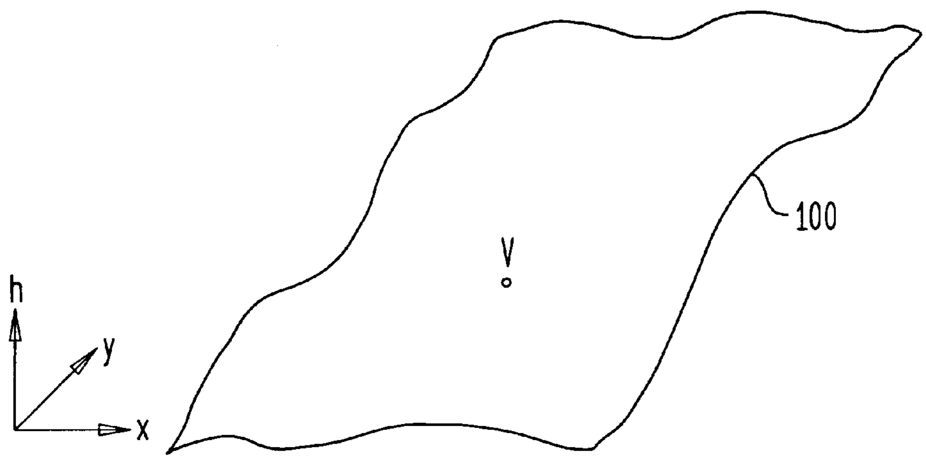
FIG. 1 is a diagram that illustrates an example of a terrain defined by a height field.

1. Overview
2. Terminology
3. Height Propagation and Occlusion Height Fields
4. Visibility Culling Based on Perspective Modulation and Orthographic Height Propagation
   A. Method
      (1) Perspective Modulation
      (2) Orthographic Height Propagation
      (3) Culling
      (4) Occlusion Tests
   B. Software, Firmware, and/or Hardware Implementation
   C. Example Environment
6. Hardware-Accelerated Visibility Culling Based on Perspective Modulation and Orthographic Height Propagation
   A. Perspective Modulation with Texture Processing
   B. Orthographic Height Propagation with Texture Processing and Blending
      (1) Texture Coordinate Shift
      (2) Shift Disk
         (i) Height Propagation Fixed at Each Iteration
         (ii) Incremental Height Propagation Varied at Each Iteration
      (3) Shift Texture
         (i) Shift Texture—Incremental Height Propagation Fixed at Each Iteration
   C. Hardware-Accelerated Example Implementation
7. Perspective Modulation/Orthographic Height Propagation Equivalence to Perspective Height Propagation
8. Example Host and Graphics Subsystem
9. Example Computer System
10. Conclusion

DETAILED DESCRIPTION OF THE INVENTION

1. Overview

The present invention provides an algorithm for visibility culling based on terrain data. Visibility determination on height fields is treated as a process of perspective height propagation from a given viewpoint. The result of such propagation is an occlusion height field. If an object is covered by the occlusion height field, it is not visible.

The inventor has recognized that perspective propagation of an original height field is equivalent to orthographic height propagation of a perspective modulated original height field. Further, such orthographic height propagation of a perspective modulated original height field according to the present invention is readily supported by existing graphics hardware and can be hardware-accelerated. In one embodiment, to compute an occlusion height field, a perspective modulation is applied to the original height field through texture mapping. Orthographic height propagation is performed by shifting texture coordinates in radial directions from the viewpoint and using blending to keep greater modulated heights. In one example implementation, an occlusion height field is generated through hardware-accelerated, multi-pass per-pixel operations.

2. Terminology

The following terms are defined so that they may be used to describe embodiments of the present invention. As used herein:

The terms "terrain" or "terrain data" are used interchangeably to refer data representative of a terrain including, but not limited to, a height field.

The term "height field" is used broadly herein and can include any type of height or elevation data, such as, a height image, height function, or digital elevation map (DEM).

"Image" or "scene" means an array of data values. A typical image might have red, green, blue, and/or alpha pixel data, or other types of pixel data information as known to a person skilled in the relevant art.

"Pixel" means a data structure, which is used to represent a picture element. Any type of pixel format can be used.

"Texture image," "texture," or "texture map" are used interchangeably to refer to an array of texels addressed by texture coordinates. A "texel" is a texture element. In some cases, texels are also referred to herein as "pixels" when the texture is used in pixel processing operations. In this way, the terms "texel" and "pixel" are sometimes used interchangeably as is often done in the computer graphics field.

3. Height Propagation and Occlusion Height Fields

Figure 2:
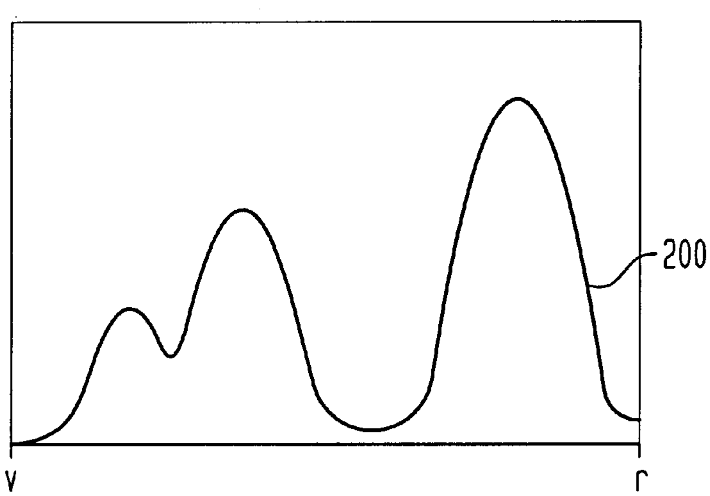
FIG. 2 is a two-dimensional view that illustrates an example radial slice of the height field extending from a viewpoint in a plane perpendicular to ground.

It helpful to first compare perspective and orthographic height propagation with respect to a radial slice along a height field. FIG. 1 is a diagram that illustrates an example of a terrain 100 defined by a height field (h) over a two-dimensional domain (x, y). A viewpoint V is a point in terrain 100, such as, the eye point or any other reference point, from which visibility in a scene is determined. FIG. 2 is a two-dimensional view that illustrates an example radial slice 200 of a height field extending along a radial direction r from a viewpoint V in a plane perpendicular to ground. Radial slice 200 is the intersection of the height field with a half-plane defined by an arbitrary direction on the ground and the vertical line passing the viewpoint and perpendicular to the ground. Note that this has nothing to do with an actual view-frustum set-up that can have arbitrary pitch and roll while still using the visibility algorithm of the present invention.

In the following discussion, for clarity, assume the height field domain is the X-Y plane, and heights are along the Z-axis. Also, in this example, assume that the viewpoint, V, has height 0; to enforce this, one can subtract the height of the viewpoint, $h_V$, from the original height field. For a given V, each point (x, y) in the domain of the height field has a minimum visible height, i.e., the minimum elevation so as to be visible from V. A minimum visible height function h(x, y) is the occlusion height field. If an object's (or its bounding box's) maximum heights are below the corresponding heights in the occlusion height field, then the object is not considered visible from the viewpoint.

Figure 3A:
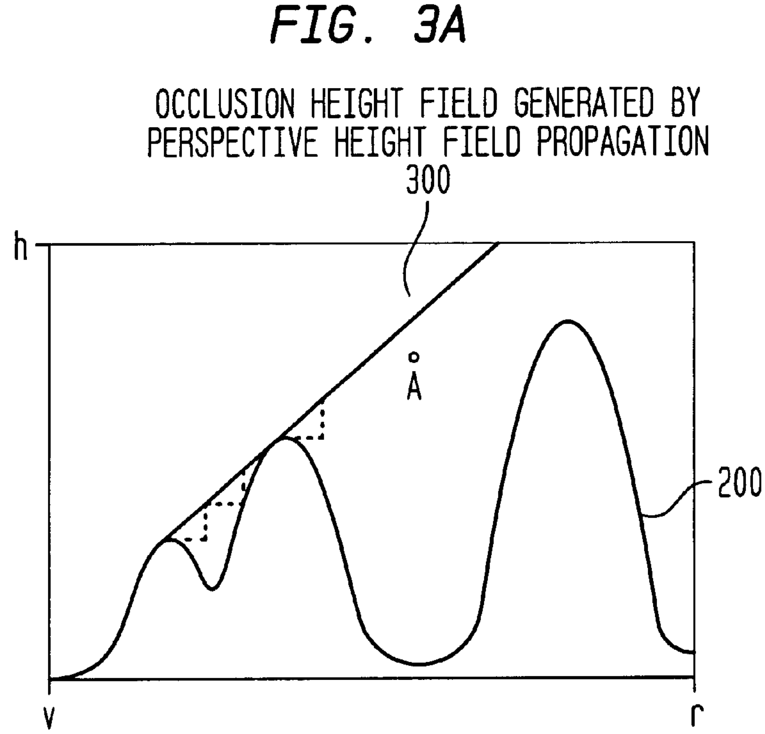
FIG. 3A is a diagram that illustrates an occlusion height field generated by a process of perspective height propagation performed with respect to the height field in the radial slice of FIG. 2.

FIG. 3A is a diagram that illustrates an occlusion height field 300 generated by a process of perspective height propagation performed with respect to radial slice 200. In a perspective height propagation, the minimum visible height at each point in the domain of the height field for radial slice 200 is computed to determine occlusion height field 300. Objects, terrain, or other geometry in areas below the occlusion height field 300 are not visible and are culled. Perspective height propagation is desirable as it produces an occlusion height field that accurately excludes what is not visible from a viewpoint V. Drawbacks of perspective height propagation are that it is computationally expensive and prohibitive for many graphics systems and real-time applications.

Figure 3B:
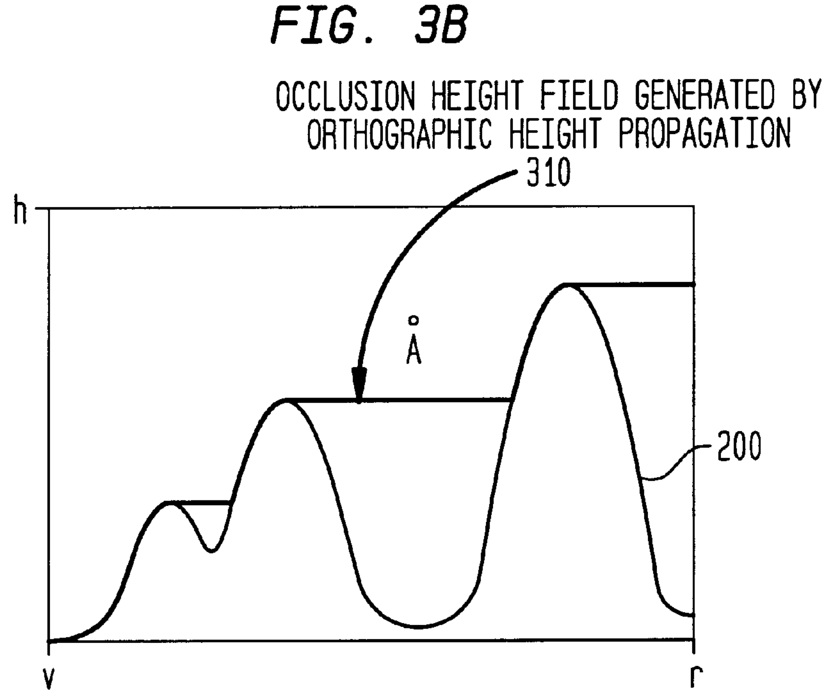
FIG. 3B is a diagram that illustrates an occlusion height field generated by a process of orthographic height propagation performed with respect to the height field in the radial slice of FIG. 2.

Compare perspective height propagation with orthographic height propagation. FIG. 3B is a diagram that illustrates an occlusion height field 310 generated by a process of orthographic height propagation performed with respect to radial slice 200. In orthographic height propagation, heights are simply compared in a near-to-far order. The greater height values determined in the comparisons define occlusion height field 310. This approach can discover some occlusion, for example, higher peaks closer to the viewer can occlude lower ones located farther away. One advantage over perspective height propagation is that the comparison operations used on orthographic height propagation can be computationally inexpensive. Such orthographic height propagation is usually too conservative. Occlusion is often caused by perspective effects (such as, lower heights close to the eye which can occlude high peaks in the distance) which would not be culled by an occlusion height field generated by orthographic height propagation. FIG. 3B shows an example point A which is not effectively culled by orthographic height propagation compared to the perspective height propagation.

Figure 5:
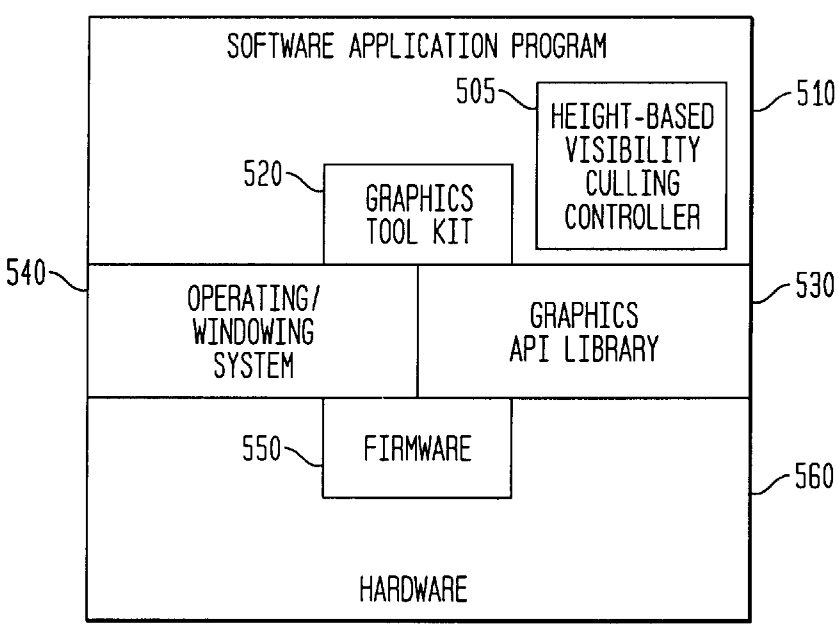
FIG. 5 is a diagram of an example graphics architecture in an implementation of the present invention.
Figure 6A:
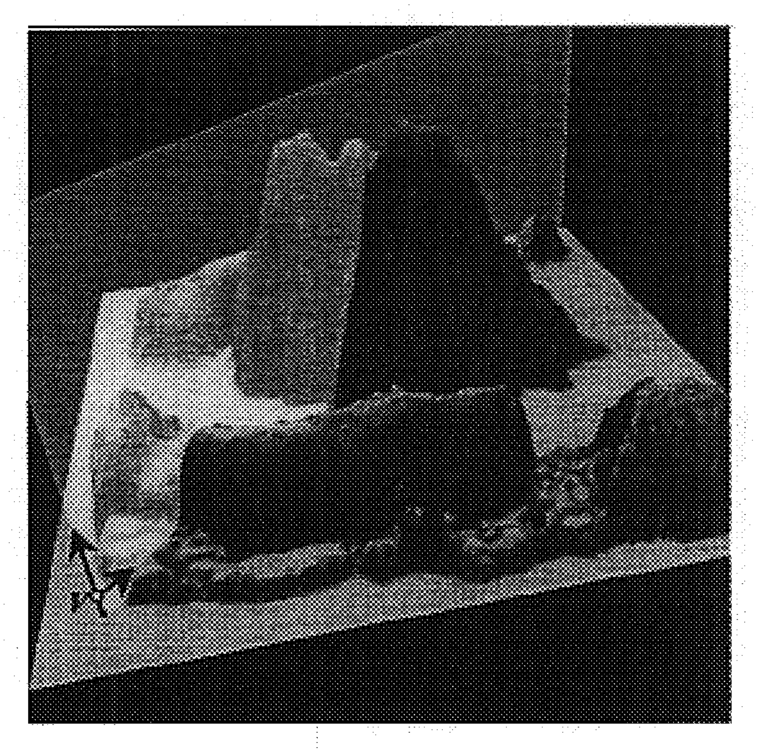
FIGS. 6A and 6B show examples of a radial slice and perspective-modulated occlusion height field generated according to the present invention.
Figure 6B:
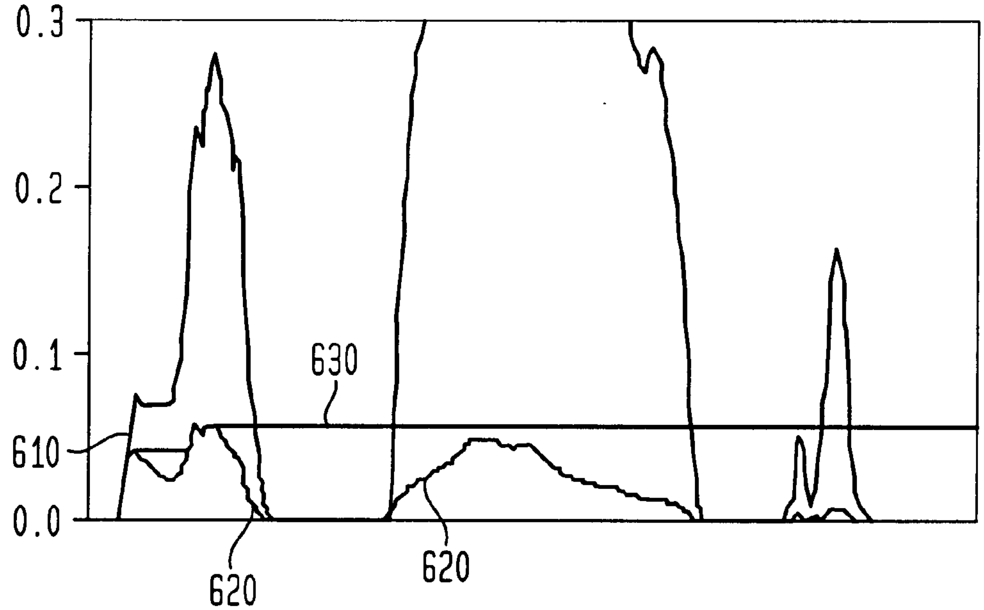
Figure 7:
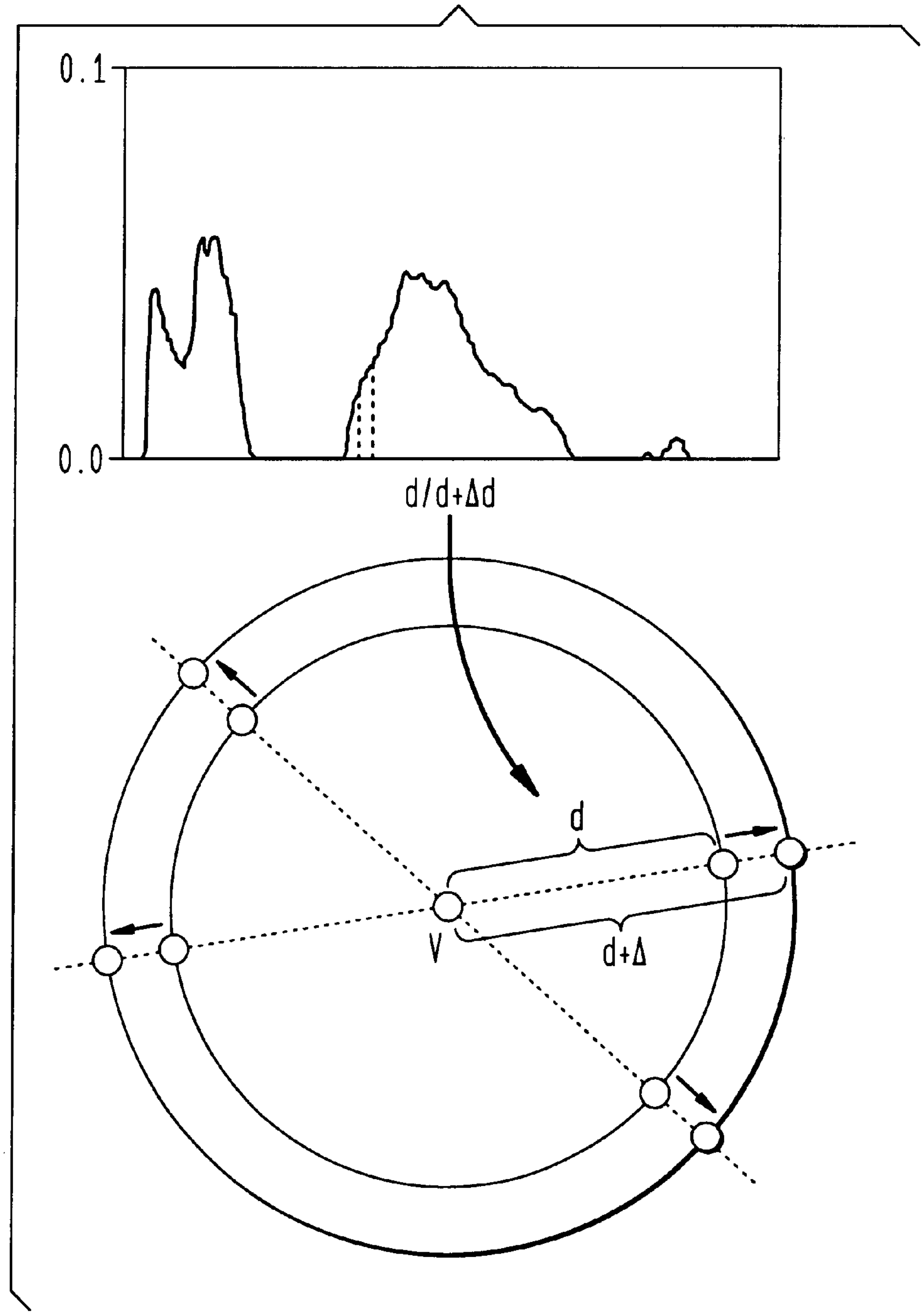
FIG. 7 is a diagram that illustrates an example of orthographic height propagation of a perspective-modulated height field according to the present invention.

The present invention is first described with respect to an overall method (FIG. 4), a graphics architecture implementation for carrying out the method (FIG. 5), and examples (FIGS. 6A, 6B, and 7). Embodiments of the present invention using texturing and blending that can be hardware-accelerated are then described (FIGS. 8A–8D). Reference is made to an example perspective modulation disk (FIG. 9A) and an example texture coordinate shift disk (FIG. 9B). A further example hardware-accelerated routine (FIG. 10) compatible with an OPENGL implementation is described. Examples of height field information generated during steps in the hardware-accelerated routine are shown (FIG. 11). Examples of an inverse function and scaled inverse function used in perspective modulation according to the present invention are discussed and shown in FIG. 12. A more detailed mathematical explanation of the equivalence of a perspective-modulated occlusion height field generated according to the present invention and an occlusion height field generated by perspective height propagation is presented and illustrated with respect to a diagram shown in FIG. 13. Finally, an example host and graphics subsystem (FIG. 14) and an example computer system (FIG. 15) that can carry out embodiments of the present invention are described.

Figure 4:
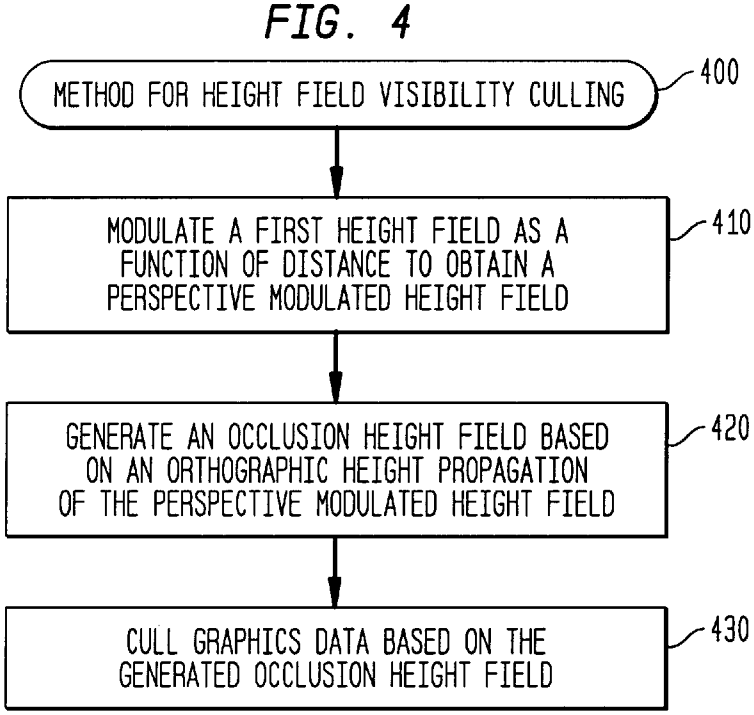
FIG. 4 is a flowchart of a method for height field visibility culling according to the present invention.

4. Visibility Culling Based on Perspective Modulation and Orthographic Height Propagation A. Method FIG. 4 shows a method for visibility culling 400 according to an embodiment of the present invention (steps 410–430). FIG. 5 shows an example graphics architecture 500 for carrying out the method for visibility culling 400. Architecture 500 is one implementation and is not intended to limit the present invention. FIGS. 6A and 6B show examples of a radial slice and a perspective-modulated occlusion height field generated according to the present invention.

(1) Perspective Modulation

In step 410, a first height field is modulated as a function of distance to obtain a perspective modulated height field. This step is also referred to as "perspective modulation." The first height field can be any height data. In one example, the first height field represents a height field having a zero height at a viewpoint V. If a viewpoint V has a height hv, then the value hv is substracted from all samples in an original height field.

Any function of distance can be used in perspective modulation depending upon a particular effect desired or needed. In one embodiment, the distance function of distance is based on the inverse of the distance d between a height field sample location and a viewpoint. In one embodiment, the distance function is equal to the inverse of the distance d. In another embodiment, the distance function is equal to the inverse of the distance d scaled by a scale factor ($f_H$). The scale factor can be set to any desired number, such as, $f_H$=20, as shown in FIG. 12.

(2) Orthographic Height Propagation

In step 420, an occlusion height field is generated based on an orthographic height propagation of the perspective modulated height field. In one embodiment, orthographic height propagation is carried out along a number of radial slices in the perspective modulated height field. The radial slices extend from the viewpoint (which can be either the eye point, eye, camera point,or other desired reference point). A comparison of height values is made along each radial slice. The greater height value is updated and propagated.

For example, consider two samples of a perspective modulated height field along a radial slice. Each propagation involves shifting sample locations by an incremental distance. The incremental distance can have a constant or variable magnitude. For example, a first sample has a height h(d), where d is a distance from the viewpoint V to the location of the first sample along a radial slice. A second sample has a height h(d+Δd), where Δd is equal to the magnitude of the incremental distance for a given propagation iteration. A value nΔd, where n is an integer or scalar, can also be used in place of Δd to vary the incremental distance. In step 420, the values h(d) and h(d+Δd) are compared. The greater value of the two is used to update the height value at the second sample location h(d+Δd). FIG. 7 shows one example step in orthographic height propagation of step 420 according to an embodiment of the present invention. Two arbitrary azimuth angles and a slice of the perspective-modulated height field are shown.

The orthographic height propagation then proceeds to a third sample location at an incremental distance from the second sample location. The height value at the third sample location is then updated with the greater of the height values at the second and third sample locations. Such propagation continues until the end of the radial slice, and until a number of radial slices have undergone orthographic height propagation. In this way, height values are pushed in radial directions away from a viewpoint. The resulting updated height values along the radial slices define an occlusion height field according to the present invention. An occlusion height field of the present invention is also referred to herein as a perspective-modulated occlusion height field.

The above description of is made by describing comparisons made along a number of radial directions. This is not intended to limit the present invention. The comparisons can be made according to the present invention through texture mapping and blending. In this case, comparisons are carried out over the perspective-modulated height field domain using texture mapping and blending instead of considering each radial direction separately.

FIG. 6A shows an example image representing a radial slice in a plane orthogonal to ground. FIG. 6B is a diagram that shows an example original height field 610. The diagram also shows a perspective modulated height field 620 (obtained in step 410), and a perspective-modulated occlusion height field 630 (obtained in step 420), according to one embodiment of the present invention.

(3) Culling

In step 430, graphics data is culled based on the occlusion height field generated in step 420. In step 430, culling is performed based on an occlusion test. Any known occlusion test can be used.

(4) Occlusion Tests

To test whether an object is occluded, vertices on the object's bounding volume are transformed in the same manner as perspective modulation (i.e. by a distance function, such as, multiplication by 1/d). Let A denote the area covered by the bounding volume's perpendicular projection on to the base of the terrain. If the maximum heights of such a transformed bounding volume are lower than all the heights in regionA of the perspective-modulated occlusion height field, the object must be hidden.

Further simplification can make height comparisons cheaper (but more conservative). For example, an axis-aligned bounding box can be computed around a perspective-transformed bounding volume. The axis-aligned bounding box is then used in occlusion tests in place of the perspective-transformed bounding volume.

The occlusion height field may be filtered down using a maximum operator to lower resolutions to facilitate faster tests. Further, a hierarchy of occlusion height fields can be derived from the original to support hierarchical tests.

The culling in step 430 can be performed early in a graphics processing pipeline to reduce the amount of geometry and terrain which must be rendered.

B. Software, Firmware, and/or Hardware Implementation

The present invention can operate in any computer processing environment including any graphics processing environment. In particular, the present invention (including one or more steps of routine 400 as described above) can be implemented in software, firmware, hardware, or in any combination thereof.

C. Example Environment

One example environment for the present invention is a computer graphics environment. FIG. 5 illustrates a block diagram of an example computer architecture 500 in which the various features of the present invention can be implemented. FIG. 5 is an example only and not intended to limit the present invention. It is an advantage of the invention that it may be implemented in many different ways, in many environments, and on many different computers or computer systems supporting graphics processing.

Architecture 500 includes six overlapping layers. Layer 510 represents a high level software application program. Layer 520 represents a three-dimensional (3D) graphics software tool kit, such as OPENGL PERFORMER, available from Silicon Graphics, Incorporated, Mountain View, Calif. Layer 530 represents a graphics application programming interface (API), which can include but is not limited to OPENGL, available from Silicon Graphics, Incorporated. Layer 540 represents system support such as operating system and/or windowing system support. Layer 550 represents firmware. Finally, layer 560 represents hardware, including graphics hardware. Hardware 560 can be any hardware or graphics hardware including, but not limited to, a computer graphics processor (single chip or multiple chip), a specially designed computer, an interactive graphics machine, a gaming platform, a low end game system, a game console, a network architecture, server, et cetera.

As will be apparent to a person skilled in the relevant art after reading the description of the invention herein, various features of the invention can be implemented in any one of the layers 510–560 of architecture 500, or in any combination of layers 510–560 of architecture 500. In particular, one or more of steps 410–430 can be implemented in any one of the layers 510–560 of architecture 500, or in any combination of layers 510–560 of architecture 300. Layers 510–560 are illustrative and one or more of layers 510–560 can be omitted depending upon a particular system configuration.

In one embodiment, a height-based visibility culling module 505 (also called a visibility culling controller) is provided according to the present invention. The height-based visibility culling module 505 provides control steps necessary to carry out routine 400. The height-based visibility culling module 505 can be implemented in software, firmware, hardware, or in any combination thereof. As shown in FIG. 5, in one example implementation height-based visibility culling module 505 is control logic (e.g., software) that is part of an application layer 510 that provides control steps necessary to carry out routine 100. In alternative implementations, height-based visibility culling module 505 can be implemented as control logic in any one of the layers 510–560 of architecture 300, or in any combination of layers 510–560 of architecture 500. In particular, height-based visibility culling module 505 can control the carrying out of one or more of steps 410–430 in any one of the layers 510–560 of architecture 500, or in any combination of layers 510–560 of architecture 500 as would be apparent to a person skilled in the art given this description. These example system environments are illustrative and not intended to limit the present invention.

6. Hardware-Accelerated Visibility Culling Based on Perspective Modulation and Orthographic Height Propagation According to a further embodiment of the present invention, hardware-accelerated visibility culling based on perspective modulation and orthographic height propagation is provided. Texturing and blending operations are used to allow perspective modulation and orthographic height propagation as described in steps 410 and 420 to be accelerated in graphics hardware.

A. Perspective Modulation with Texture Processing

Figure 8A:
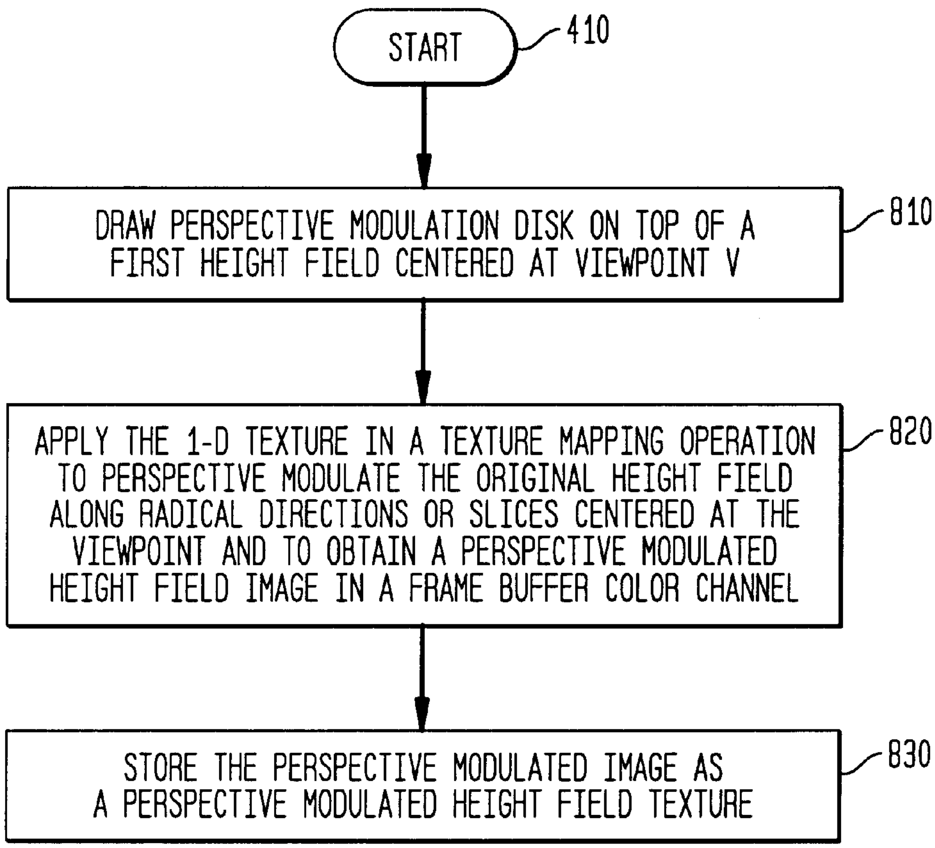
FIGS. 8A, 8B, 8C, and 8D are routines involving texturing and blending according to embodiments of the present invention.
Figure 9A:
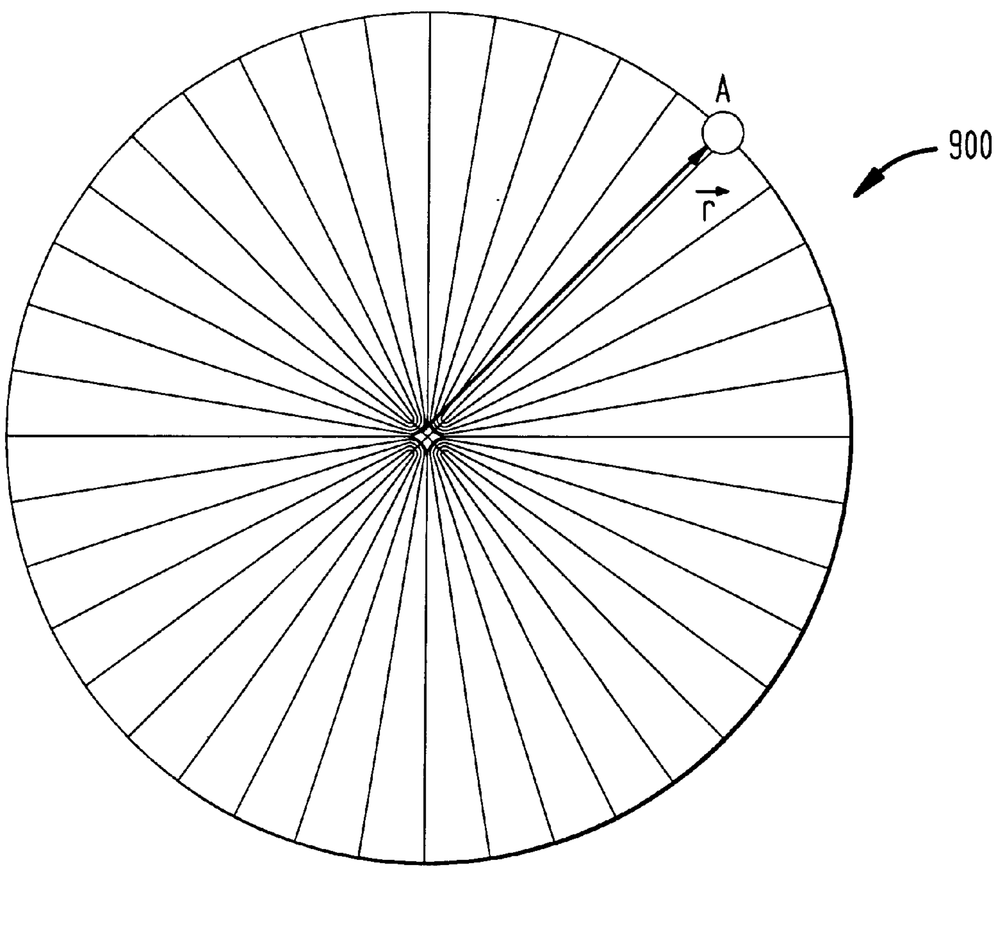
FIG. 9A shows a perspective modulation disk in a hardware-accelerated embodiment of the present invention.

FIG. 8A shows one embodiment where hardware acceleration of the perspective modulation step 410 is carried out using a perspective modulation disk and a one-dimensional (1-D) texture (steps 810–820). The 1-D texture contains inverse distance values (1d). FIG. 9A shows an example perspective modulation disk 900 which is a triangle fan. Point A is an arbitrary vertex on the boundary and |r| is the radius of disk 900. The center texture coordinate is 0. Other points on disk 900 have a texture coordinate equal to the magnitude of the radius at the respective point. For example, the texture coordinate for point A is equal to |r| as shown in FIG. 9A.

In step 810, the perspective modulation disk is drawn on top of the original height field centered at viewpoint V. The 1-D texture is applied in a texture mapping operation to perspective modulate the original height field along radial directions or slices centered at the viewpoint and to obtain a perspective modulated height field image in a frame buffer color channel (step 820). The perspective modulated image is then stored as a perspective modulated height field texture (step 830).

B. Orthographic Height Propagation with Texture Processing and Blending

In one embodiment, hardware acceleration of the orthographic height propagation step 420 is carried out through texturing and blending. Moving values from one location to another is exactly what texture mapping is for. Combining the incoming value from texture mapping and an existing value is a typical blending operation.

More specifically, a propagation of distance $\Delta d$ for all pixels on the terrain is carried out in two steps. First, the height field is used as a texture map. The value h(d) is brought to a distance $d+\Delta d$ by shifting texture coordinates in radial directions from the viewpoint V. Second, the framebuffer is initialized with the original height field. A blending mode which saves the larger of the source (i.e. the incoming value from the shifted height field) and destination performs the comparison. A benefit of such a texture mapping based algorithm is that by using bilinear filtering when doing texture mapping, one can effectively reconstruct height field values from samples using bilinear interpolation. This provides higher accuracy as compared to treating the height field as a collection of step functions.

(1) Texture Coordinate Shift

According to a further feature of the present invention, two embodiments for shifting texture coordinates in radial directions from the viewpoint in the orthographic height propagation step 420 are provided. The first embodiment involves use of a shift disk. The second embodiment involves uses of a shift texture. Each of these example implementations are discussed and described below with respect to FIGS. 8B–8D, 9B, and 10.

(2) Shift Disk

Conventionally, texture coordinates are specified on a per-vertex basis and interpolated during scan-conversion. Let the coordinates on the height field texture be (u, v), $0 \leqq u \leqq 1$, $0 \leqq v \leqq 1$, and let the dimensions of the height field in the world space be L×L (assuming a square height field to simplify the discussion but not limit the present invention). A distance difference of $\Delta d$ in the world space corresponds to a shift in texture coordinates by s,$s=\Delta d/L$. To shift texture coordinates by an amount s in radial directions, away from the center, a 2-D shift disk 910 is constructed as illustrated in FIG. 9B.

When disk 910 is drawn with the original height field as a texture, the height values are "pushed away" from the viewpoint by $\Delta d$. When disk 910 is drawn on top of the original height field, with the disk centered at the eye's vertical projection onto the X-Y plane, a blending operation compares values and keeps the greater. In this way, a hardware-accelerated comparison of h(d) and $h(d+\Delta d)$, propagating heights by distance $\Delta d$, is carried out.

The full propagation of heights, though, requires that heights be pushed all the way to the edge of the height field. More precisely, to compute an occlusion height field covering the entire height field domain, all heights closer to the viewpoint have to be compared with all heights farther away in the same radial direction from the eye. Given the basic operation of height propagation by $\Delta d$, a full propagation is performed by doing an incremental distance $\Delta d$ at a time, until the height value at the eye position reaches the furthest point on the height field's edge. Evidently, if the height field edge point furthest from the viewpoint is at distance $d_F$, then the number of steps required is $N=d_F/\Delta d$.

In examples, a full propagation can be constructed in either of the following two approaches, whichever is faster on a particular piece of hardware. The propagation distance remains fixed or varies in each successive propagation. In the first fixed propagation distance way, an iterative replacement of the height field texture is made. After every step (a propagation of distance Δd), the original texture is replaced with the resulting one. The algorithm proceeds to the next propagation of Δd with the same shift disk, the result of which is a propagation of 2Δd; and so on. In the second variable propagation distance approach, the amount of texture coordinate shifts is increased by modifying the disk after every step. For example, for the n-th step, $1 \leqq n \leqq N$. a disk is used that shifts texture coordinates by $s=n\Delta d/L$. In other words, at step n, h(d) is shifted and compared to h(d+n Δd).

The first approach is preferable when there is a fast way of turning the rendering result into a texture, e.g. when the hardware allows direct rendering to a texture. The geometry of the disk does not need to be modified in between steps so that the disk can exist in hardware-optimized forms like a display list that can be passed to an OPENGL graphics system. If converting rendered images to textures is a slow operation for available graphics resources, then the second approach has the advantage of always using the same height field texture.

(i) Height Propagation Fixed at Each Iteration

Figure 8B:
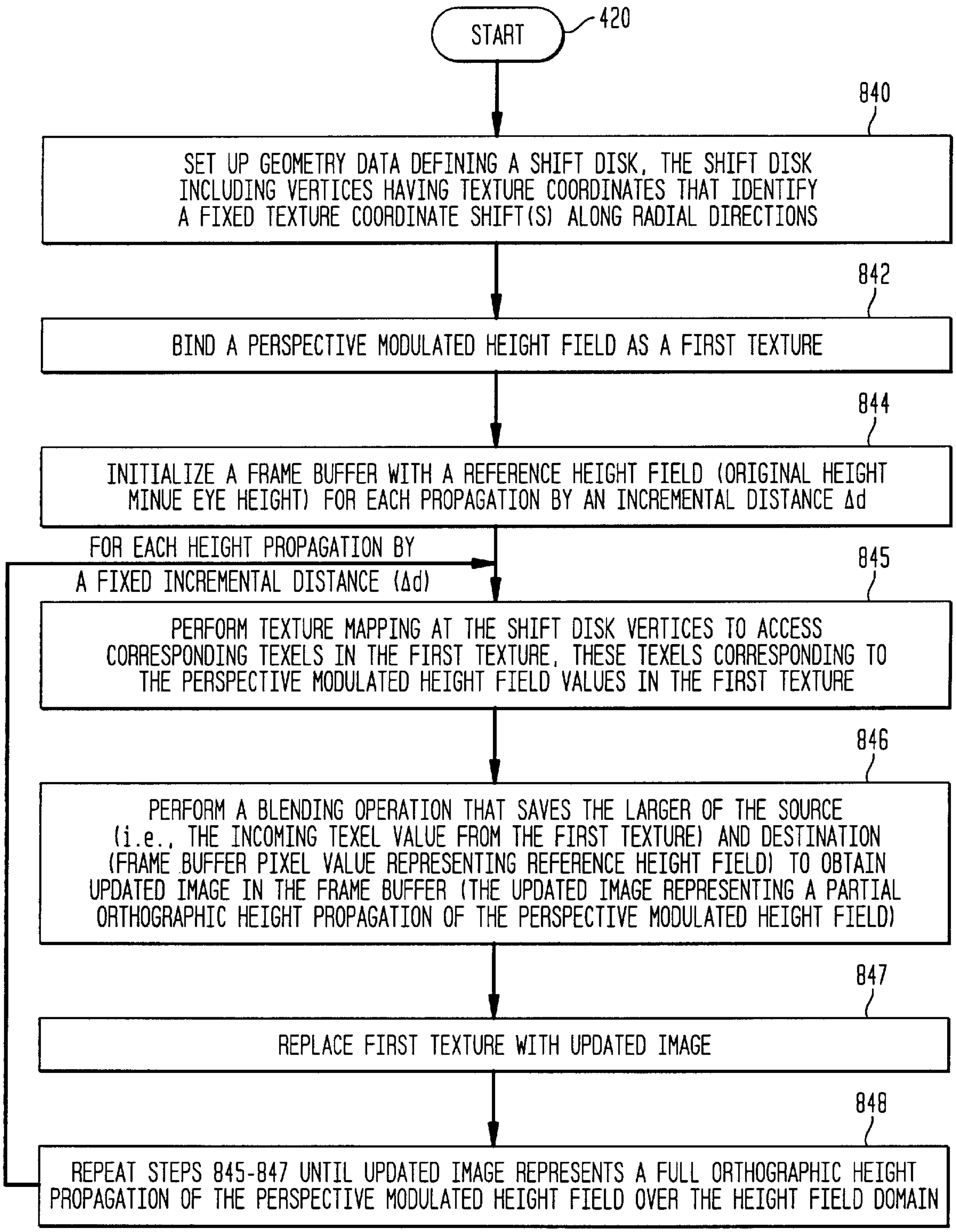

FIG. 8B shows a routine for carrying out step 420 using a shift disk with an incremental height propagation fixed at each iteration (steps 840–848). First, geometry data is set up defining a shift disk. For example, in an OPENGL environment the geometry data can be provided in a display list. The shift disk includes vertices having texture coordinates that identify a fixed texture coordinate shift along radial directions (step 840).

In step 842, a perspective modulated height field is bound as a first texture. This identifies the perspective modulated height field as a first texture to be used in texture mapping in a graphics pipeline rendering pass.

In step 844, a frame buffer is initialized with a reference height field. The reference height field is the original height field minus the eye height at a viewpoint.

Heights are propagated by a fixed incremental distance Δd. For each height propagation, texture mapping is performed at the shift disk vertices to access corresponding texels in the first texture (step 845). These texels corresponding to the perspective modulated height field values in the first texture.

In step 846, a blending operation is performed that saves the larger of the source (i.e. the incoming texel value from the first texture) and destination (frame buffer pixel value representing reference height field) to obtain an updated image in the frame buffer. The updated image represents a partial orthographic height propagation of the perspective modulated height field.

In step 847, the first texture is replaced with the updated image.

Processing is then repeated for the next height propagation (step 848). In particular, steps 845–847 are repeated until the updated image represents a full orthographic height propagation of the perspective modulated height field over the height field domain. In other words, steps 845–847 are repeated until the fixed incremental height propagation has been incremented to reach the outer radius or end of the shift disk. As would be apparent to a person skilled in the art given this description, each iteration of steps 845–847 can be carried out in a different rendering pass by a graphics pipeline.

(ii) Incremental Height Propagation Varied at Each Iteration

Figure 8C:
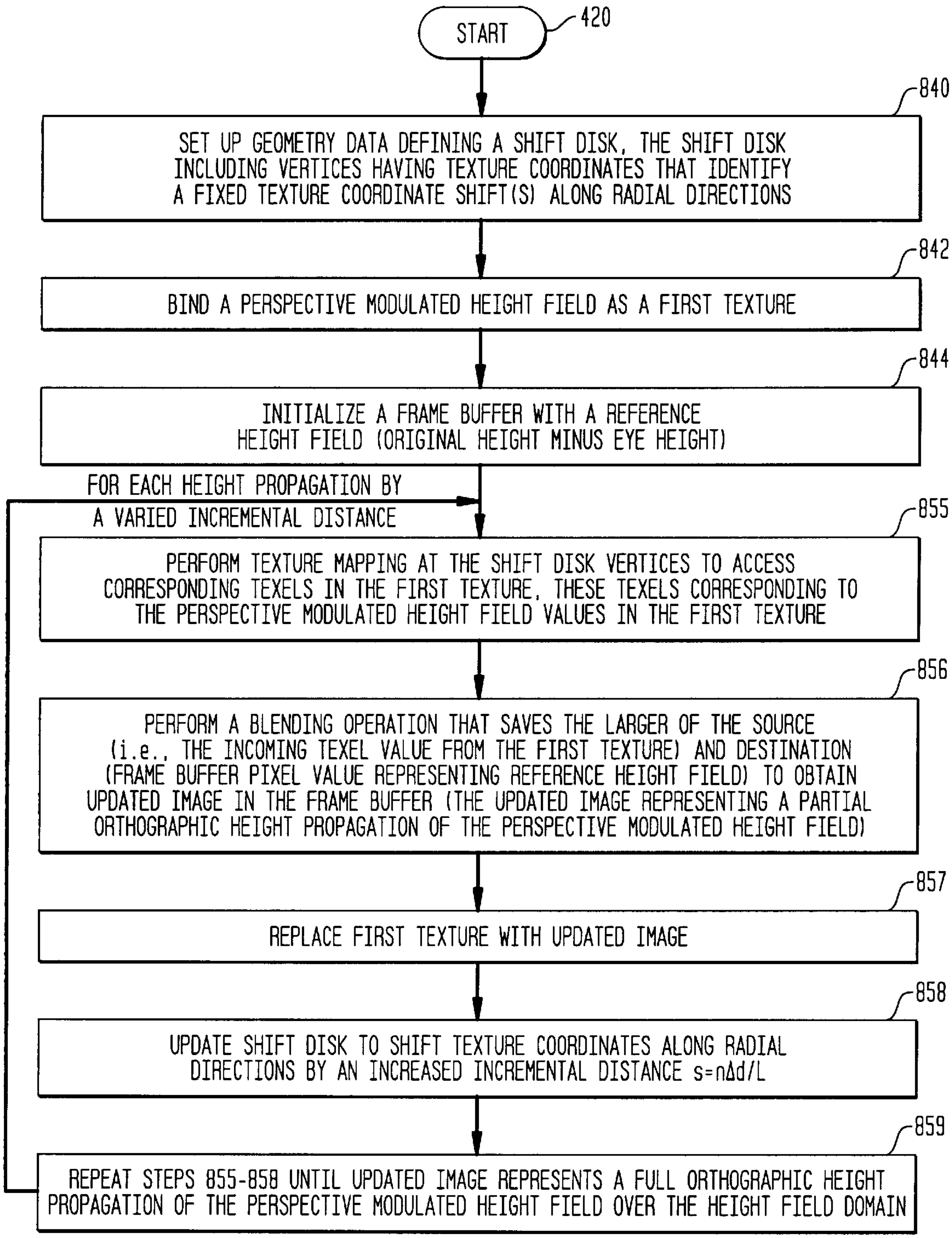

FIG. 8C shows a routine for carrying out step 420 using a shift disk with an incremental height propagation varied at each iteration (steps 840–844 and 855–859). Steps 840–844 proceed as described above with respect to FIG. 8B. Heights are propagated by an incremental distance Δd which varies with each iteration. In one embodiment, n=1 during the first iteration and is then incremented by 1 in each successive iteration (n=2, 3, . . . ). In this way, processing is saved as more remote radial locations from a viewpoint are sampled less frequently.

For each height propagation, texture mapping is performed at the shift disk vertices to access corresponding texels in the first texture (step 855). These texels corresponding to the perspective modulated height field values in the first texture.

In step 856, a blending operation operation is performed that saves the larger of the source (i.e. the incoming texel value from the first texture) and destination (frame buffer pixel value representing reference height field) to obtain an updated image in the frame buffer. The updated image represents a partial orthographic height propagation of the perspective modulated height field.

In step 857, the first texture is replaced with the updated image.

In step 858, the shift disk is updated to shift texture coordinates along radial directions by an increased incremental distance nΔd.

Processing is then repeated for the next height propagation (step 859). In particular, steps 855–858 are repeated until the updated image represents a full orthographic height propagation of the perspective modulated height field over the height field domain. In other words, steps 855–858 are repeated until the fixed incremental height propagation has been incremented to reach the outer radius or end of the shift disk. As would be apparent to a person skilled in the art given this description, each iteration of steps 855–858 can be carried out in a different rendering pass by a graphics pipeline.

(3) Shift Texture

Specifying texture coordinates at vertices leaves it to linear interpolation to generate per-pixel texture coordinates. In order for the approximation to be good enough, the disk must not be too coarse in tessellation. On graphics systems that feature pixel textures or dependent textures (such as an OPENGL system with pixel texture extension), texture coordinates can be modified per-pixel through the use of another texture which stores, instead of color values, texture coordinates. A dependent texture for texture coordinate shift $s=\Delta d/L$ can be computed and applied to rectangular geometry as a cheap and more precise replacement of the disk. The approach using iterative replacement of the height field texture is more desirable because it requires only one dependent shift texture, just as it requires only a fixed shift disk.

(i) Shift Texture—Incremental Height Propagation Fixed at Each Iteration

Figure 8D:
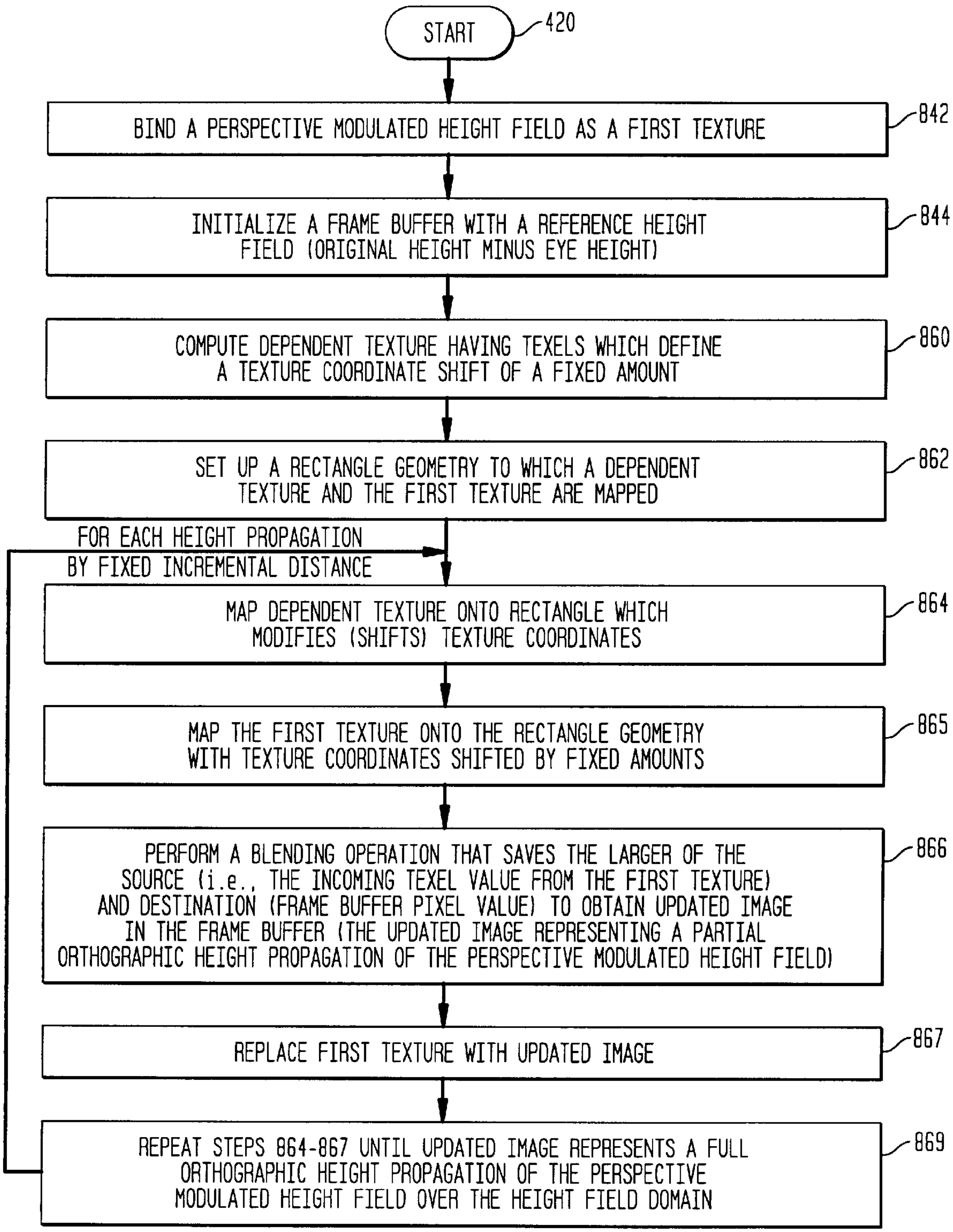

FIG. 8D shows a routine for carrying out step 420 using a shift texture with an incremental height propagation fixed at each iteration (steps 842–844 and 860–869). Steps 842–844 proceed as described above with respect to FIG. 8B.

In step 860, a dependent texture is computed. The dependent texture has texels which define a texture coordinate shift of a fixed amount.

In step 862, a rectangular geometry is set up to which the dependent texture and the first texture are mapped.

In step 864, texture mapping is performed. The dependent texture is mapped onto the rectangle geometry which modifies (i.e., shifts) the texture coordinates for each pixel on the rectangle.

In step 865, texture mapping is performed. The first texture is mapped onto the rectangle geometry with texture coordinates shifted by the fixed amount.

In step 866, a blending operation is performed that saves the larger of the source (i.e. the incoming texel value from the first texture) and destination (frame buffer pixel value) to obtain updated image in the frame buffer (the updated image representing a partial orthographic height propagation of the perspective modulated height field).

In step 867, the first texture is copied over with the updated image.

Processing is then repeated for the next height propagation (step 869). In particular, steps 864–867 are repeated until the updated image represents a full orthographic height propagation of the perspective modulated height field over the height field domain. As would be apparent to a person skilled in the art given this description, each iteration of steps 864–867 can be carried out in a different rendering pass by a graphics pipeline using a pixel texture processing, such as, OPENGL pixel texture extension. Steps 864–867 are repeated until the updated image in a frame buffer represents a full orthographic height propagation of the perspective modulated height field over the height field domain.

C. Hardware-Accelerated Example Implementation

Figure 10:
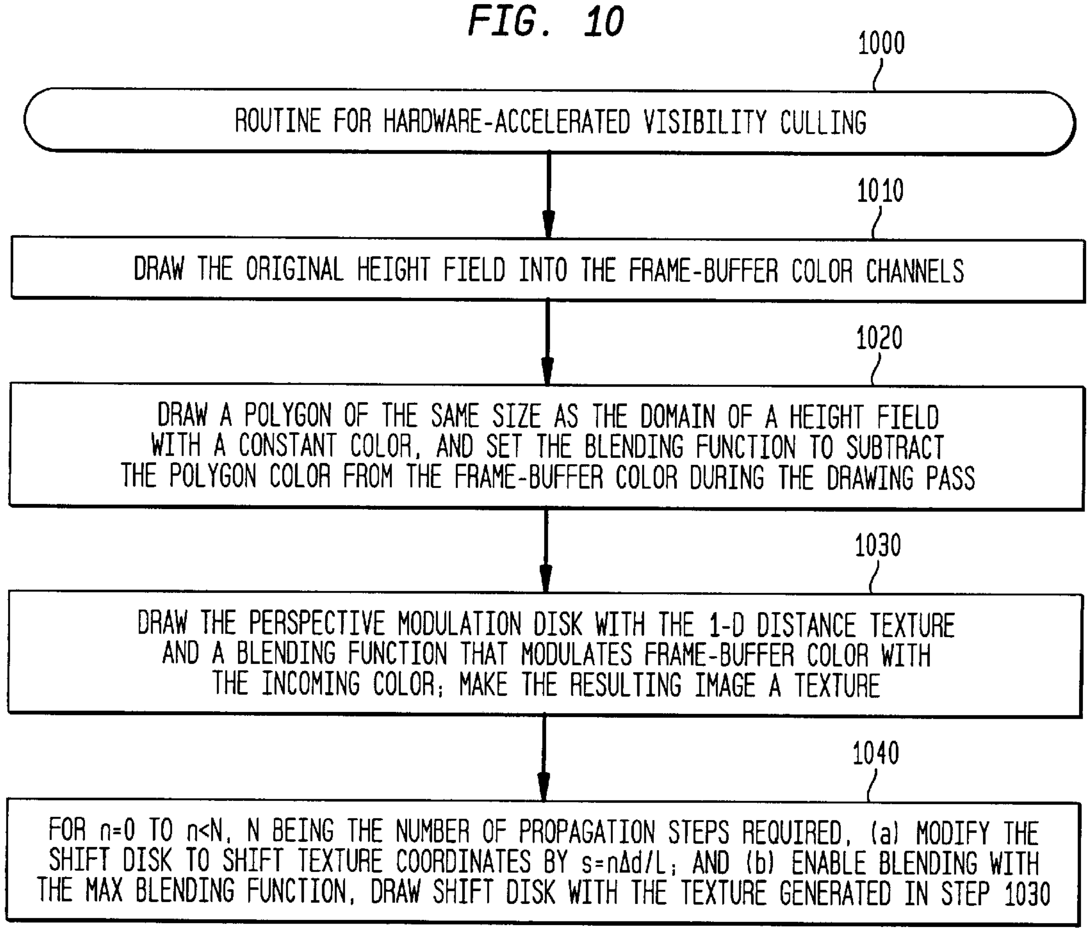
FIG. 10 is a diagram of a hardware-accelerated routine according to an embodiment of the present invention.
Figure 11:
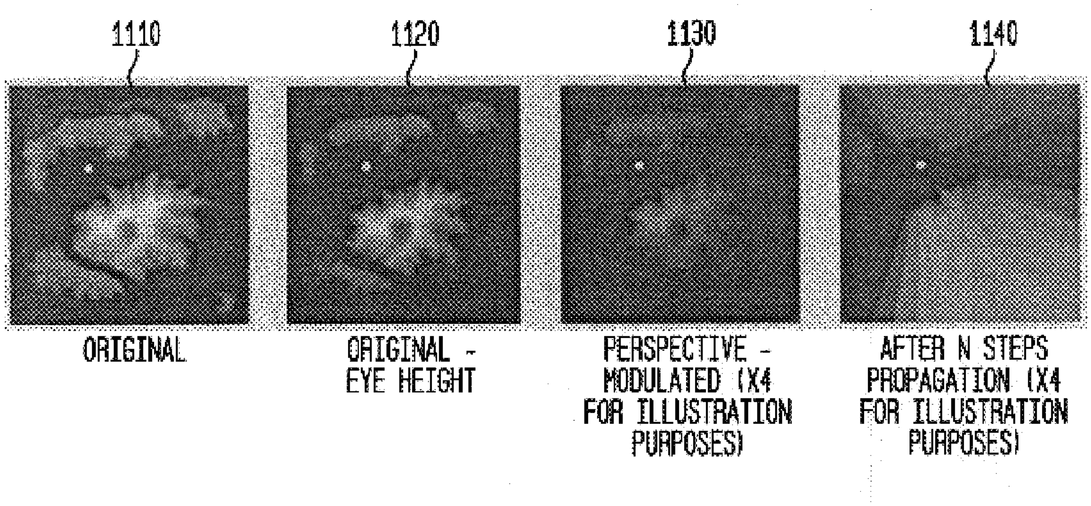
FIG. 11 shows four images representing height field information generated during steps in the hardware-accelerated routine of FIG. 10.

One embodiment is described with respect to a multi-pass routine for hardware-accelerated visibility culling 1000 shown in FIG. 10 (steps 1010–1040).

FIG. 11 shows images representing the resulting height field 1110–1140 obtained after different steps in routine 1000. The white dot indicates the viewpoint (i.e, the eye position). Images 1130 and 1140 are scaled by four in the figure to aid viewing of detail.

Routine 1000 lends itself to different mappings onto hardware with different features and capabilities. One current implementation uses OpenGL on a personal computer (PC) with a 450 MHz Pentium III processor and an Nvidia GeForce2 graphics card, utilizing only a minimal set of features needed to carry out routine 1000. This example implementation is illustrative and not intended to limit the present invention.

Steps 1010 and 1020 can be performed in one, two or more passes through an OPENGL pipeline. In step 1010, an original height field is drawn into the frame-buffer color channels (such as, the red, green, or blue channel). The intensity of original height field values is shown in image 1110.

In step 1020, a polygon of the same size as the height field is drawn with a constant color value. The constant color value represents the eye height, that is, the height at a viewpoint V. The blending function is set to subtract the polygon color from the frame-buffer color during the drawing pass. The intensity of the resulting height field values (original—eye height) is shown in image 1120.

In step 1030, a drawing pass is performed that includes drawing a perspective modulation disk with a 1-D distance texture, setting a blending function to modulate the frame-buffer color with the incoming color, and making the resulting image after the blending a texture. This texture represent a perspective modulated height field according to one embodiment of the present invention. The intensity of the height field values in a perspective modulated height field is shown in image 1130.

In step 1040, a number of drawing passes N are made, N being the number of propagation steps to be performed. FIG. 9B shows an example texture coordinate shift disk. In step 1040, for n=0 to n<N, a texture coordinate shift disk is modified to shift texture coordinates by $s=n\Delta d/L$ during each respective pass.

Blending is enabled with a MAX blending function to draw the shift disk with the texture generated in step 1030. This results in a perspective modulated occlusion height field according to one embodiment of the present invention. The intensity of the height field values in a perspective modulated occlusion height field is shown in image 1140.

An incremental distance $\Delta d$ of one pixel width was also chosen, which means the amount of texture coordinate shift per step of propagation is $s=1/256$.

The worst-case scenario for N, the number of propagation steps required, occurs when the eye is at one of the corners of the height field, in which case N is the diagonal length in units of pixel width, i.e. $N=256^*\sqrt{2}$. For orthographic height propagation, a shift disk is used whose shift is modified for each propagation step, since frame-buffer-to-texture conversion can be relatively slow on this example graphics system. In one example, both the perspective modulation disk and the shift disk are divided into 40 sectors so that the former has 40 triangles and the latter 120 triangles (40+2*40=120).

The color precision of pixels and texels on a current generation of graphics hardware may be limited. For example, the maximum resolution of a color channel may be only 8 bits. The 1/d function has a very fast fall-off so that most heights in perspective-modulated height field are small. Such values use only a small portion of the 8-bit dynamic range, which means only a small number of height differences can be represented in some embodiments of the present invention. Sixteen 16-bit color channels or greater can largely solve the problem in embodiments of the present invention where such bit precision is available in the graphics hardware.

According to a further feature of the invention, to alleviate or reduce the precision problem, the 1/d function is scaled by multiplying a factor $f_H$, $F_H>1$. If, after the multiplication, a value in the 1/d function goes above 1, it is clamped to 1. The scaling does makes the modulation factors uniformly larger, so that height values after perspective modulation spread over in a larger range. Note that scaling the 1/d function by a constant factor maintains the property that orthographical height propagation after perspective modulation is equivalent to a perspective height propagation.

Evidently, scaling by $f_H$ and clamping to 1 makes the 1/d function a constant 1 from d=0 to $d=f_H$. In other words, when modulated by the scaled 1/d function, the heights within radius $f_H$ from the eye are not modified. What this means is that, in the subsequent height propagation, within the radius of $f_H$ the original heights are orthographically propagated, not those after perspective modulation. Because of this, by scaling one can give up some occlusion generated by perspective viewing within the radius off However, if $f_H$ is kept small, such loss is trivial. FIG. 12 compares the 1/d function and the result of scaling by $f_H=20$.

7. Perspective Modulation/Orthographic Height Propagation Equivalence to Perspective Height Propagation As mentioned above, the inventor has recognized that orthographic height propagation of a perspective modulated original height field is equivalent to perspective height propagation of the original height field. Although orthographic height propagation gives overly conservative results on the original height field, the present invention introduces a transformation of heights so that the orthographic propagation in the transformed height field is equivalent to perspective propagation in the original. In this way, the present invention allows orthographic propagation to be directly accelerated through use of texture mapping and blending as described above. The transformation basically enables one to perform the equivalence of perspective height propagation with hardware acceleration. Better still, the transformation itself is also fully supported by commercially available graphics hardware.

FIG. 13 shows a point on the X-Y plane, $P_1$, at distance $d_{P1}$ from the V; $P_1$ has height $h_{P1}$, and its perspective-propagated height, $h_{P1}'$, at a $P_2$ at distance $d_{P2}=d_{P1}+\Delta d$, $\Delta d \geqq 0$, along the line passing $P_1$, and V, is $$h'_{P1} = \frac{d_{P2}}{d_{P1}} h_{P1} \tag{1}$$

If $h_{P1}'>h_{P2}$, at point $P_2$ a height must only be less than $h_{P1}'$, instead of $h_{P2}$, in order not to be seen from V, i.e. $h_{P1}'$ is the minimum visible height at $P_2$. This is simply the effect of perspective projection. Perspective height propagation is to compare $h_{P1}'$ with the stored height ($h_{P2}$) at $P_2$; if the former is greater, then the stored value is updated. The propagation starts at the viewpoint and goes from near to far in distance.

From FIG. 13, one can observe that if $$h_{P1}'>h_{P1} \tag{2}$$

then using equation (1), one has $$\frac{d_{P2}}{d_{P1}} h_{P1} > h_{P1},$$

or, $$\frac{h_{P1}}{d_{P1}} = \frac{h_{P2}}{d_{P2}} \tag{3}$$

Clearly, if (3) holds, then (2) does, too. This means that the quantity, $$\hat{h} > \frac{h}{d},$$

at the two points can be directly compared to decided whether the perspective-propagated height of one is greater than the original height of the other. In other words, if the original height field is transformed by multiplying each height value by 1/d, then orthographic height propagation of the transformed height field is equivalent to perspective propagation on the original.

8. Example Host and Graphics Subsystem

Figure 14:
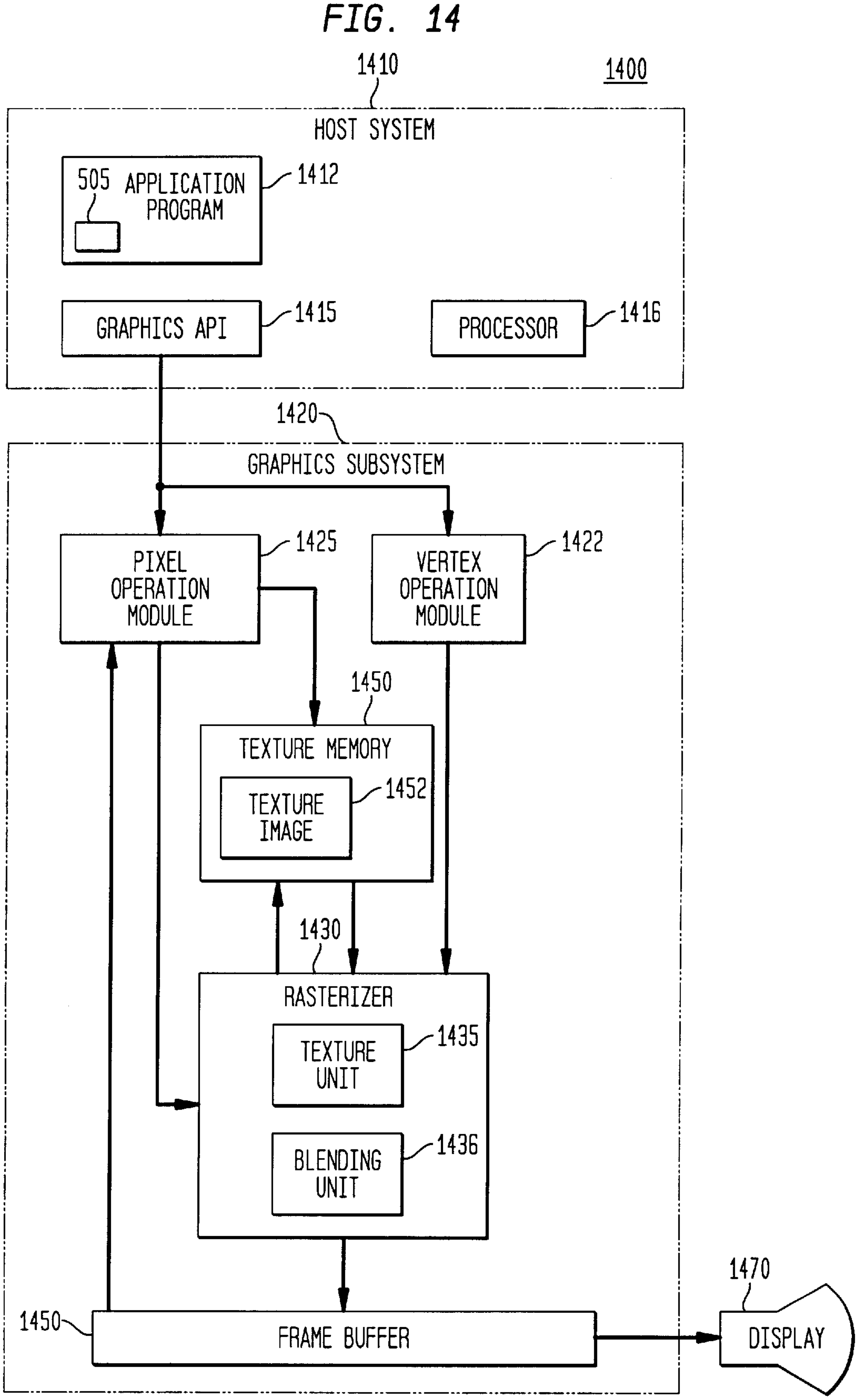
FIG. 14 is a block diagram of a host and graphics subsystem according to an embodiment of the present invention.

FIG. 14 illustrates an example graphics system 1400 according to an embodiment of the present invention. This example graphics system is illustrative and not intended to limit the present invention.

Graphics system 1400 comprises a host system 1410, a graphics subsystem 1420, and a display 1470. Each of these features of graphics system 1400 is further described below.

Host system 1410 comprises an application program 1412, a hardware interface or graphics API 1415, and a processor 1416. Application program 1412 can be any program requiring the rendering of a computer image or scene. The computer code of application program 1412 is executed by processor 1416. Application program 1412 accesses the features of graphics subsystem 1420 and display 1470 through hardware interface or graphics API 1415. As shown in FIG. 14, in one example implementation height field visibility culling control module 505 is control logic (e.g., software) that is part of or accessed by application 1412.

Graphics subsystem 1420 comprises a vertex operation module 1422, a pixel operation module 1424, a rasterizer 1430, a texture memory 1440, and a frame buffer 1450. Texture memory 1440 can store one or more texture images 1442. Texture memory 1440 is connected to a texture unit 1434 by a bus or other communication link (not shown). Rasterizer 1430 comprises texture unit 1434 and a blending unit 1436. The operation of these features of graphics system 1400 would be known to a person skilled in the relevant art given the description herein.

In embodiments of the present invention, texture unit 1434 can obtain either a point sample, a bilinearly filtered texture sample, or a trilinearly filtered texture sample from texture image 1442. Blending unit 1436 blends texels and/or pixel values according to weighting values to produce a single texel or pixel. The output of texture unit 1434 and/or blending module 1436 is stored in frame buffer 1450. Display 1470 can be used to display images or scenes stored in frame buffer 1450.

An embodiment of the invention shown in FIG. 14 has a multipass graphics pipeline. It is capable of operating on each pixel of an object (image) during each pass that the object makes through the graphics pipeline. For each pixel of the object, during each pass that the object makes through the graphics pipeline, texture unit 1434 can obtain texture sample(s) from the texture image 1442 stored in texture memory 1440.

Other embodiments of the present invention can include OPENGL pixel texture extension and/or NVIDIA-style texture-dependent texture lookups.

9. Example Computer System

Figure 15:
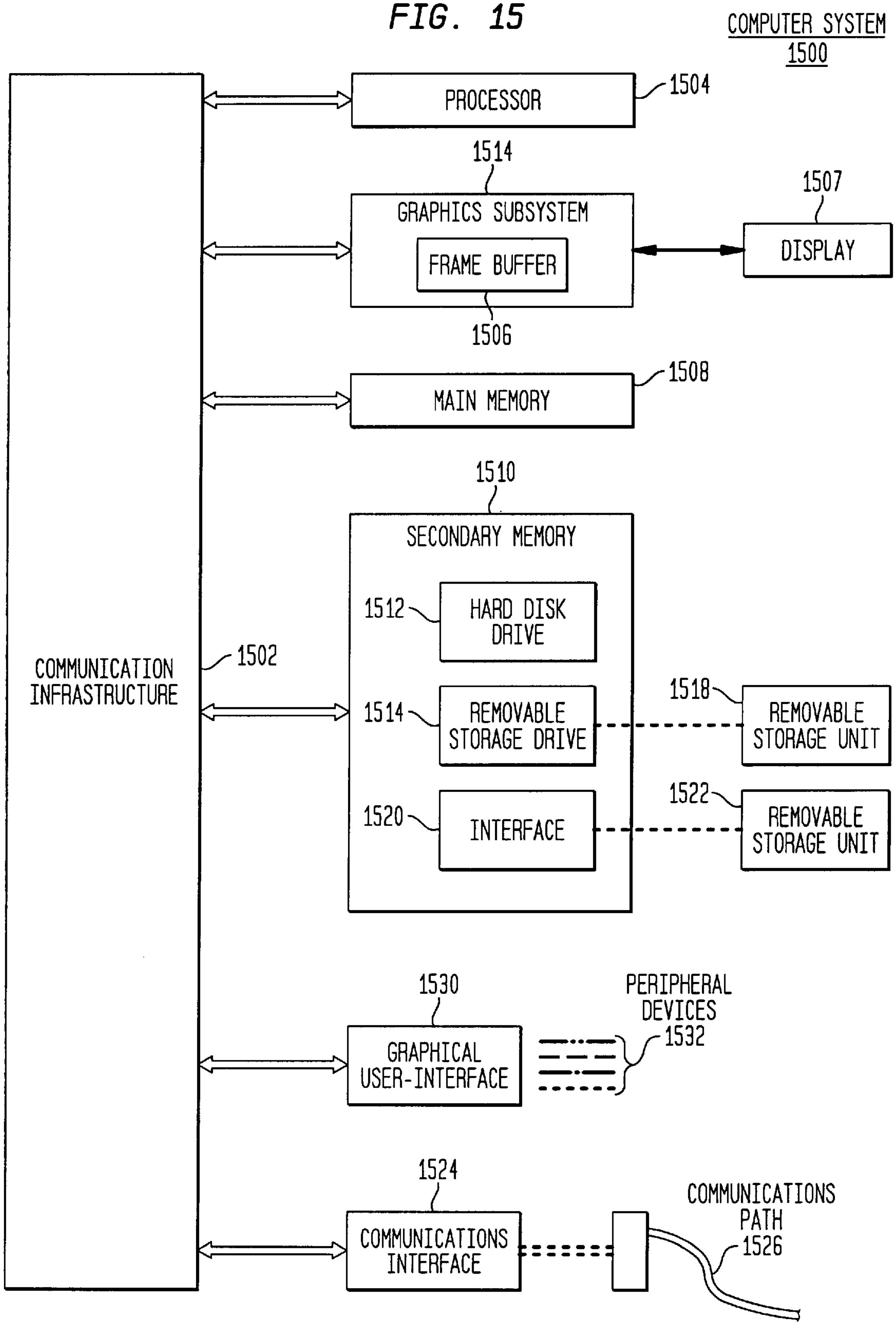
FIG. 15 is a block diagram of a computer system according to an embodiment of the present invention.

Referring to FIG. 15, an example of a computer system 1500 is shown, which can be used to implement computer program product and computer program code embodiments of the present invention. This example computer system is illustrative and not intended to limit the present invention. Computer system 1500 represents any single or multi-processor computer. Single-threaded and multi-threaded computers can be used. Unified or distributed memory systems can be used.

Computer system 1500 includes one or more processors, such as processor 1504, and one or more graphics subsystems, such as graphics subsystem 1505. One or more processors 1504 and one or more graphics subsystems 1505 can execute software and implement all or part of the features of the present invention described herein. Graphics subsystem 1505 can be implemented, for example, on a single chip as a part of processor 1504, or it can be implemented on one or more separate chips located on a graphic board. Each processor 1504 is connected to a communication infrastructure 1502 (e.g., a communications bus, cross-bar, or network). After reading this description, it will become apparent to a person skilled in the relevant art how to implement the invention using other computer systems and/or computer architectures.

Computer system 1500 also includes a main memory 1508, preferably random access memory (RAM), and can also include secondary memory 1510. Secondary memory 1510 can include, for example, a hard disk drive 1512 and/or a removable storage drive 1514, representing a floppy disk drive, a magnetic tape drive, an optical disk drive, etc. The removable storage drive 1514 reads from and/or writes to a removable storage unit 1518 in a well-known manner. Removable storage unit 1518 represents a floppy disk, magnetic tape, optical disk, etc., which is read by and written to by removable storage drive 1514. As will be appreciated, the removable storage unit 1518 includes a computer usable storage medium having stored therein computer software and/or data.

In alternative embodiments, secondary memory 1510 may include other similar means for allowing computer programs or other instructions to be loaded into computer system 1500. Such means can include, for example, a removable storage unit 1522 and an interface 1520. Examples can include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

In an embodiment, computer system 1500 includes a frame buffer 1506 and a display 1507. Frame buffer 1506 is in electrical communication with graphics subsystem 1505. Images stored in frame buffer 1506 can be viewed using display 1507.

Computer system 1500 can also include a communications interface 1524. Communications interface 1524 allows software and data to be transferred between computer system 1500 and external devices via communications path 1526. Examples of communications interface 1524 can include a modem, a network interface (such as Ethernet card), a communications port, etc. Software and data transferred via communications interface 1524 are in the form of signals which can be electronic, electromagnetic, optical or other signals capable of being received by communications interface 1524, via communications path 1526. Note that communications interface 1524 provides a means by which computer system 1500 can interface to a network such as the Internet.

Computer system 1500 can include one or more peripheral devices 1532, which are coupled to communications infrastructure 1502 by graphical user-interface 1530. Example peripheral devices 1532, which can form a part of computer system 1500, include, for example, a keyboard, a pointing device (e.g., a mouse), a joy stick, and a game pad. Other peripheral devices 1532, which can form a part of computer system 1500 will be known to a person skilled in the relevant art given the description herein.

The present invention can be implemented using software running (that is, executing) in an environment similar to that described above with respect to FIG. 15. In this document, the term "computer program product" is used to generally refer to removable storage unit 1518, a hard disk installed in hard disk drive 1512, or a carrier wave or other signal carrying software over a communication path 1526 (wireless link or cable) to communication interface 1524. A computer useable medium can include magnetic media, optical media, or other recordable media, or media that transmits data. These computer program products are means for providing software to computer system 1500.

Computer programs (also called computer control logic) are stored in main memory 1508 and/or secondary memory 1510. Computer programs can also be received via communications interface 1524. Such computer programs, when executed, enable the computer system 1500 to perform the features of the present invention as discussed herein. In particular, the computer programs, when executed, enable the processor 1504 to perform the features of the present invention. Accordingly, such computer programs represent controllers of the computer system 1500.

In an embodiment where the invention is implemented using software, the software may be stored in a computer program product and loaded into computer system 1500 using removable storage drive 1514, hard drive 1512, or communications interface 1524. Alternatively, the computer program product may be downloaded to computer system 1500 over communications path 1526.

The control logic (software), when executed by the one or more processors 1504, causes the processor(s) 1504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to a person skilled in the relevant art.

10. Conclusion

Various embodiments of the present invention have been described above, which are capable of being implemented on a graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for visibility culling, comprising:

(A) modulating a first height field as a function of distance to obtain a perspective modulated height field; and (B) generating an occlusion height field based on an orthographic height propagation of the perspective modulated height field.

2. The method of claim 1, further comprising:

(C) culling graphics data based on the occlusion height field generated in step (B).

3. The method of claim 1, wherein said step (A) comprises modulating the first height field as an inverse function of distance to obtain the perspective modulated height field.

4. The method of claim 1, wherein said step (A) comprises modulating the first height field as an inverse function of distance scaled by a scaling factor to obtain the perspective modulated height field.

5. The method of claim 1, wherein said step (A) includes mapping texture from a one-dimensional texture, the one-dimensional texture having a set of texels addressed by a set of texture coordinates and wherein values of the set of texels are an inverse function of the respective set of texture coordinates.

6. The method of claim 1, wherein said step (A) comprises:

drawing a perspective modulation disk of radial slices on top of the first height field centered at a viewpoint V; and mapping texture from a one-dimensional texture to obtain the perspective modulated height field.

7. The method of claim 6, wherein said step (A) further comprises blending texels mapped from the one-dimensional texture and corresponding samples in the first height field to obtain the perspective modulated height field.

8. The method of claim 1, wherein said step (B) comprises:

(i) comparing height values of the perspective-modulated height field at first and second sample locations separated by a propagation distance d, the first location being closer to the viewpoint than the second location; and (ii) updating the height value of the second location with the greater height value determined in said comparing step.

9. The method of claim 8, wherein said step (B) comprises a series of iterations, wherein said steps (i) and (ii) are performed for multiple sampling locations along the lengths of the radial slices, and wherein the incremental distance between two sampling locations is fixed throughout the series of iterations.

10. The method of claim 8, wherein said step (B) comprises a series of iterations, wherein said steps (i) and (ii) are performed for multiple sampling locations along the lengths of the radial slices, and wherein the incremental distance between two sampling locations is varied throughout the series of iterations.

11. The method of claim 1, wherein the first height field is stored as a first height field texture and the perspective modulated height field is stored in a color channel of a frame buffer, said step (B) comprises:

drawing a first shift disk including texture mapping texels from the first height field texture; and blending the texture mapped texels and the color values of the perspective modulated height field stored in the color channel of the frame buffer to obtain an updated shift disk, the updated shift disk having updated color values representing the updated height values based on a maximum comparison and texture coordinates shifted by an incremental distance.

12. The method of claim 1, wherein the perspective modulated height field is drawn in a first texture, and a dependent shift texture stores a set of texture coordinates, said step (B) comprises:

drawing a first shift disk including performing a per-pixel texture operation to shift texture coordinates in the dependent shift texture by an incremental distance along radial directions from a viewpoint; and blending the texture mapped texels and the color values of the perspective modulated height field stored in the color channel of the frame buffer to obtain an updated shift disk, the updated shift disk having updated color values representing the updated height values based on a maximum comparison and texture coordinates shifted by an incremental distance.

13. The method of claim 1, further comprising, prior to said step (A), the step of subtracting a height value at a viewpoint from each height sample in an original height field to obtain the first height field.

14. The method of claim 1, wherein said steps (A) and (B) are accelerated in hardware.

15. A routine for hardware-accelerated visibility culling, comprising:

drawing an original height field to obtain a first image in a frame buffer color channel;

drawing a polygon of the same size as the domain of a height field with a constant color representative of the height at a viewpoint to obtain a second image in the frame buffer, said drawing including blending to subtract the polygon color from the first image frame buffer color, such that a polygon having a color equal to a viewpoint reference height field is stored as the second image in the frame buffer, the reference height field being equal to the original height minus the constant color height;

drawing a perspective modulation disk, including texture mapping with a first texture addressed by a first set of texture coordinates, blending to modulate the second image frame buffer color channel value by the texels in the first texture, and storing a resultant perspective modulated image as a second texture addressed by a second set of texture coordinates, wherein the first texture includes a one-dimensional array of texels having values which are a function of the first set of texture coordinates, and the second texture includes a two-dimensional array of texels having values which represent a perspective modulation of the viewpoint reference height field; and for each propagation, modifying a shift disk to shift texture coordinates by a respective propagation distance; and drawing an updated shift disk with texture mapped from the second texture, including blending with a maximum blending function that saves a maximum height value between two compared sampling locations along radial directions on the shift disk.

16. A system for visibility culling, comprising:

(A) modulating means for modulating a first height field as a function of distance to obtain a perspective modulated height field; and (B) generating means for generating an occlusion height field based on an orthographic height propagation of the perspective modulated height field.

17. The system of claim 16, further comprising:

(C) culling means for culling graphics data based on the occlusion height field generated in step (B).

18. A system, comprising:

a host computer; and a graphics subsystem coupled to the host computer;

wherein the host computer includes a visibility culling controller that controls the graphics subsystem to modulate a first height field as a function of distance to obtain a perspective modulated height field and to generate an occlusion height field based on an orthographic height propagation of the perspective modulated height field.

19. The system of claim 18, wherein the graphics subsystem includes a texture mapping unit and a blending unit, and wherein the visibility culling controller controls the texture mapping unit to modulate a first height field as a function of distance to obtain a perspective modulated height field and controls the texture mapping unit and the blending unit to generate the occlusion height field based on an orthographic height propagation of the perspective modulated height field.

20. The system of claim 19, wherein the texture mapping unit and the blending unit carry out processing operations in hardware such that the texture mapping unit modulates a first height field as a function of distance to obtain a perspective modulated height field in a processing operation implemented at least in part in hardware and the texture mapping unit and the blending unit generate the occlusion height field based on an orthographic height propagation of the perspective modulated height field in another processing operation implemented at least in part in hardware.

21. A system, comprising:

a visibility culling controller that controls a graphics subsystem to modulate a first height field as a function of distance to obtain a perspective modulated height field, and to generate an occlusion height field based on an orthographic height propagation of the perspective modulated height field.

22. The system of claim 21, wherein the graphics subsystem carries out processing operations in hardware such that modulation of the first height field as a function of distance to obtain a perspective modulated height field is carried out in a processing operation implemented at least in part in hardware and generation of the occlusion height field based on an orthographic height propagation of the perspective modulated height field is carried out in another processing operation implemented at least in part in hardware.

23. A visibility culling controller, comprising:

first control logic that enables a graphics subsystem to modulate a first height field as a function of distance to obtain a perspective modulated height field; and second control logic that enables a graphics subsystem to generate an occlusion height field based on an orthographic height propagation of the perspective modulated height field.

24. A computer program product comprising a computer useable medium having computer program logic recorded thereon for enabling a processor to render a computer scene, said computer program logic comprising:

first computer readable code that enables a processor to modulate a first height field as a function of distance to obtain a perspective modulated height field; and; and second control logic that enables a processor to generate an occlusion height field based on an orthographic height propagation of the perspective modulated height field.

25. A visibility culling controller, comprising:

first control logic that modulates a first height field as a function of distance to obtain a perspective modulated height field; and second control logic that generates an occlusion height field based on an orthographic height propagation of the perspective modulated height field.

26. A system, comprising:

a visibility culling controller;

a first height field; and a graphics pipeline;

wherein, in response to the visibility culling controller, the graphics pipeline carries out operations in multiple passes to modulate the first height field as a function of distance to obtain a perspective modulated height field, and to generate an occlusion height field based on an orthographic height propagation of the perspective modulated height field.

27. The system of claim 26, wherein the graphics pipeline comprises an OPENGL graphics pipeline.

* * * * *